US009527959B2

(12) United States Patent
Byrne

(10) Patent No.: US 9,527,959 B2
(45) Date of Patent: Dec. 27, 2016

(54) MOISTURE CURABLE ORGANOPOLYSILOXANE COMPOSITION

(71) Applicant: Christopher Byrne, Clifton Park, NY (US)

(72) Inventor: Christopher Byrne, Clifton Park, NY (US)

(73) Assignee: Momentive Performance Materials Inc., Waterford, NY (US)

(*) Notice: Subject to any disclaimer, the term of this patent is extended or adjusted under 35 U.S.C. 154(b) by 0 days.

(21) Appl. No.: 14/369,553

(22) PCT Filed: Dec. 21, 2012

(86) PCT No.: PCT/US2012/071351
§ 371 (c)(1),
(2) Date: Jun. 27, 2014

(87) PCT Pub. No.: WO2013/101755
PCT Pub. Date: Jul. 4, 2013

(65) Prior Publication Data
US 2015/0005443 A1    Jan. 1, 2015

Related U.S. Application Data

(60) Provisional application No. 61/581,299, filed on Dec. 29, 2011.

(51) Int. Cl.
| | | |
|---|---|---|
| C08G 77/08 | (2006.01) | |
| C08G 65/00 | (2006.01) | |
| C08F 10/00 | (2006.01) | |
| C08G 18/83 | (2006.01) | |
| C08G 63/91 | (2006.01) | |
| C08G 64/42 | (2006.01) | |
| C09D 123/26 | (2006.01) | |
| C09D 167/02 | (2006.01) | |
| C09D 169/00 | (2006.01) | |
| C09D 171/00 | (2006.01) | |
| C09D 175/04 | (2006.01) | |
| B01J 31/02 | (2006.01) | |
| C09J 201/10 | (2006.01) | |
| C08L 83/10 | (2006.01) | |
| C08G 77/06 | (2006.01) | |
| C08G 77/44 | (2006.01) | |

(52) U.S. Cl.
CPC ............ *C08G 65/00* (2013.01); *B01J 31/0225* (2013.01); *C08F 10/00* (2013.01); *C08G 18/837* (2013.01); *C08G 63/914* (2013.01); *C08G 64/42* (2013.01); *C08G 77/08* (2013.01); *C08L 83/10* (2013.01); *C09D 123/26* (2013.01); *C09D 167/02* (2013.01); *C09D 167/025* (2013.01); *C09D 169/00* (2013.01); *C09D 171/00* (2013.01); *C09D 175/04* (2013.01); *C09J 201/10* (2013.01); *B01J 2231/14* (2013.01); *B01J 2531/54* (2013.01); *C08G 77/06* (2013.01); *C08G 77/44* (2013.01); *Y02P 20/52* (2015.11)

(58) Field of Classification Search
CPC ........ C08G 77/18; C08G 77/70; C09J 183/04; C08L 101/10; B01J 23/6447
USPC .......................................................... 528/14
See application file for complete search history.

(56) References Cited

U.S. PATENT DOCUMENTS

| | | |
|---|---|---|
| 2,191,587 A | 2/1940 | Rethreck |
| 2,958,688 A | 11/1960 | Brooks et al. |
| 3,278,457 A | 10/1966 | Milgrom |
| 3,278,458 A | 10/1966 | Belner |
| 3,278,459 A | 10/1966 | Herold |
| 3,427,256 A | 2/1969 | Milgrom |
| 3,427,334 A | 2/1969 | Belner |
| 3,427,335 A | 2/1969 | Herold |
| 3,627,722 A | 12/1971 | Seiter |
| 3,632,557 A | 1/1972 | Brode |
| 3,786,081 A | 1/1974 | Oppenlaender et al. |
| 3,890,269 A | 6/1975 | Martin |
| 3,936,578 A | 2/1976 | Dumoulin et al. |
| 3,960,575 A | 6/1976 | Martin |

(Continued)

FOREIGN PATENT DOCUMENTS

| | | |
|---|---|---|
| EP | 543292 B1 | 5/1992 |
| EP | 0604997 | 7/1994 |
| EP | 625548 B1 | 11/1994 |
| EP | 1055456 A2 | 11/2000 |
| EP | 1230298 B1 | 9/2003 |
| EP | 1731573 A1 | 12/2006 |
| EP | 1985666 A1 | 10/2008 |
| EP | 2130873 A1 | 12/2009 |

(Continued)

OTHER PUBLICATIONS

US 5,536,414, 6/1996, Delfort et al. (withdrawn).

(Continued)

*Primary Examiner* — Kuo-Liang Peng
(74) *Attorney, Agent, or Firm* — Joseph Waters; McDonald Hopkins LLC

(57) ABSTRACT

The present invention provides curable compositions comprising non-tin metal catalysts that accelerate the condensation curing of moisture-curable silicones/non-silicones. In particular, the present invention provides bismuth(III) sulfonate complexes that are particularly suitable as replacements for organotin in sealant and RTV formulations. In one embodiment, the present invention provides bismuth (III) camphorsulfonate and bismuth(III) methanesulfonate complexes. Further, these bismuth(III) sulfonate complexes are comparable or superior to organotin such as DBTDL, exhibit certain behavior in the presence of components that allow for tuning or adjusting the cure characteristics of the present compositions, and provide good adhesion and storage stability.

33 Claims, 2 Drawing Sheets

(56) References Cited

U.S. PATENT DOCUMENTS

| | | |
|---|---|---|
| 3,971,751 A | 7/1976 | Isayama et al. |
| 4,247,330 A | 1/1981 | Sanders, Jr. |
| 4,248,992 A | 2/1981 | Takago |
| 4,312,801 A | 1/1982 | Hiriart Bodin et al. |
| 4,345,053 A | 8/1982 | Rizk et al. |
| 4,379,766 A | 4/1983 | Mack et al. |
| 4,404,348 A | 9/1983 | Fau et al. |
| 4,410,677 A | 10/1983 | Lampe |
| 4,481,367 A | 11/1984 | Knopf |
| 4,528,353 A | 7/1985 | Lucas et al. |
| 4,537,942 A | 8/1985 | Brown-Wensley et al. |
| 4,612,054 A | 9/1986 | Hamon |
| 4,625,012 A | 11/1986 | Rizk et al. |
| 4,665,116 A | 5/1987 | Kornhaber et al. |
| 4,769,412 A | 9/1988 | Inoue et al. |
| 4,985,491 A | 1/1991 | Reisch |
| 5,194,489 A | 3/1993 | Frances et al. |
| 5,304,621 A | 4/1994 | Staiger et al. |
| 5,395,860 A | 3/1995 | Leung et al. |
| 5,472,987 A | 12/1995 | Reedy et al. |
| 5,502,144 A | 3/1996 | Kuo et al. |
| 5,623,044 A | 4/1997 | Chiao |
| 5,741,839 A | 4/1998 | Scheim |
| 5,840,428 A | 11/1998 | Blizzard et al. |
| 5,852,137 A | 12/1998 | Hsieh et al. |
| 5,858,280 A | 1/1999 | Zhang et al. |
| 5,919,888 A | 7/1999 | Lawrey et al. |
| 5,932,650 A | 8/1999 | Bayly |
| 5,945,466 A | 8/1999 | Ikeno et al. |
| 5,985,991 A | 11/1999 | Beljanski et al. |
| 6,072,013 A | 6/2000 | Manzouji et al. |
| 6,162,756 A | 12/2000 | Friebe et al. |
| 6,207,794 B1 | 3/2001 | Yamasaki et al. |
| 6,303,731 B1 | 10/2001 | Carlson et al. |
| 6,310,170 B1 | 10/2001 | Johnston et al. |
| 6,359,101 B1 | 3/2002 | O'Connor et al. |
| 6,369,184 B1 | 4/2002 | Bohin et al. |
| 6,515,164 B1 | 2/2003 | Bolte et al. |
| 6,599,633 B1 | 7/2003 | Wolf et al. |
| 6,696,383 B1 | 2/2004 | Le-Khac et al. |
| 6,753,400 B2 | 6/2004 | Inoue et al. |
| 6,797,912 B2 | 9/2004 | Derehag et al. |
| 6,827,875 B2 | 12/2004 | Schelhaas et al. |
| 6,833,423 B2 | 12/2004 | Roesler et al. |
| 6,875,864 B2 | 4/2005 | Pillai et al. |
| 6,911,109 B2 | 6/2005 | Giroux et al. |
| 6,919,293 B1 | 7/2005 | Ooms et al. |
| 7,115,695 B2 | 10/2006 | Okamoto et al. |
| 7,351,782 B2 | 4/2008 | Wakabayashi et al. |
| 7,365,145 B2 | 4/2008 | Yang et al. |
| 7,504,468 B2 | 3/2009 | Guennouni et al. |
| 7,527,838 B2 | 5/2009 | Correia |
| 7,541,076 B2 | 6/2009 | Landon |
| 7,550,547 B2 | 6/2009 | Wakabayashi et al. |
| 7,553,901 B2 | 6/2009 | Horikoshi et al. |
| 7,569,653 B2 | 8/2009 | Landon |
| 7,605,220 B2 | 10/2009 | Wakabayashi et al. |
| 7,642,331 B2 | 1/2010 | Pouchelon et al. |
| 7,732,554 B2 | 6/2010 | O'Keefe et al. |
| 7,772,332 B2 | 8/2010 | Wakabayashi et al. |
| 7,781,513 B2 | 8/2010 | Lucas et al. |
| 7,863,398 B2 | 1/2011 | Devi et al. |
| 8,076,401 B2 | 12/2011 | Schindler et al. |
| 8,242,226 B2 | 8/2012 | Maliverney et al. |
| 8,426,546 B2 | 4/2013 | Maliverney et al. |
| 8,461,283 B2 | 6/2013 | Maliverney et al. |
| 8,586,688 B2 | 11/2013 | Okamoto et al. |
| 2002/0146573 A1 | 10/2002 | Shimada et al. |
| 2002/0156210 A1 | 10/2002 | Luo |
| 2002/0198352 A1 | 12/2002 | Tanaka et al. |
| 2003/0069379 A1 | 4/2003 | Inoue et al. |
| 2004/0122253 A1 | 6/2004 | Smith et al. |
| 2004/0127669 A1 | 7/2004 | Ueno et al. |
| 2005/0020706 A1 | 1/2005 | Kolbach et al. |
| 2005/0054765 A1 | 3/2005 | Putzer |
| 2005/0137322 A1 | 6/2005 | Roesler |
| 2005/0171315 A1 | 8/2005 | Wakabayashi et al. |
| 2006/0019398 A1 | 1/2006 | Corson et al. |
| 2007/0191541 A1 | 8/2007 | Guennouni et al. |
| 2007/0197820 A1 | 8/2007 | Van Holen et al. |
| 2007/0203297 A1 | 8/2007 | Wakabayashi et al. |
| 2007/0237912 A1 | 10/2007 | Correia |
| 2007/0275255 A1 | 11/2007 | Ooms |
| 2008/0039565 A1 | 2/2008 | Ridey et al. |
| 2008/0076843 A1 | 3/2008 | Clark |
| 2008/0188624 A1 | 8/2008 | Yano |
| 2009/0018260 A1 | 1/2009 | Correia et al. |
| 2009/0087635 A1 | 4/2009 | Yano |
| 2009/0088547 A1 | 4/2009 | Schamschurin et al. |
| 2009/0124751 A1* | 5/2009 | Lucas et al. .................. 524/507 |
| 2009/0156737 A1 | 6/2009 | Schindler |
| 2009/0182091 A1 | 7/2009 | Noro |
| 2009/0182099 A1 | 7/2009 | Noro et al. |
| 2009/0186993 A1 | 7/2009 | Noro et al. |
| 2009/0299017 A1 | 12/2009 | Tsuno et al. |
| 2009/0306307 A1 | 12/2009 | Ahn et al. |
| 2010/0063215 A1 | 3/2010 | Yano et al. |
| 2010/0152373 A1 | 6/2010 | Wakabayashi et al. |
| 2010/0184883 A1 | 7/2010 | Detemmerman et al. |
| 2010/0197855 A1 | 8/2010 | Blom et al. |
| 2010/0234510 A1 | 9/2010 | Feder et al. |
| 2011/0009558 A1 | 1/2011 | Maliverney |
| 2011/0021684 A1 | 1/2011 | Maliverney |
| 2011/0028640 A1 | 2/2011 | Klein et al. |
| 2011/0028647 A1 | 2/2011 | Sixt et al. |
| 2011/0040034 A1 | 2/2011 | Maliverney et al. |
| 2011/0043034 A1 | 2/2011 | Pien |
| 2011/0046299 A1 | 2/2011 | Maliverney et al. |
| 2011/0098392 A1 | 4/2011 | Barrandon et al. |
| 2011/0098420 A1 | 4/2011 | Takizawa |
| 2011/0124802 A1* | 5/2011 | Maliverney et al. ......... 524/588 |
| 2011/0281969 A1 | 11/2011 | Maliverney |
| 2012/0016063 A1 | 1/2012 | Maton et al. |
| 2012/0065308 A1 | 3/2012 | Sumi et al. |
| 2012/0172471 A1 | 7/2012 | Maliverney |
| 2012/0172473 A1 | 7/2012 | Maliverney |

FOREIGN PATENT DOCUMENTS

| | | |
|---|---|---|
| EP | 1550700 B1 | 1/2011 |
| EP | 0947531 B1 | 7/2011 |
| EP | 2388297 | 11/2011 |
| EP | 2246393 B1 | 6/2014 |
| FR | 2925510 * | 6/2009 |
| JP | 63245466 A | 10/1988 |
| JP | 63265924 A | 11/1988 |
| JP | 5039428 A | 2/1993 |
| JP | 5117518 A | 5/1993 |
| JP | 0649210 A | 2/1994 |
| JP | 0673291 A | 3/1994 |
| JP | 6212077 A | 8/1994 |
| JP | 6345973 A | 12/1994 |
| JP | 7179762 A | 7/1995 |
| JP | 0841358 A | 2/1996 |
| JP | 10101932 A | 4/1998 |
| JP | 11029713 A | 2/1999 |
| JP | 2001089618 A | 4/2001 |
| JP | 2001342363 A | 12/2001 |
| JP | 2003119387 A | 4/2003 |
| JP | 2006225629 A | 8/2006 |
| JP | 2006316287 A | 11/2006 |
| JP | 2008231142 A | 10/2008 |
| JP | 2010013524 A | 1/2010 |
| JP | 04472632 B2 | 6/2010 |
| JP | 2010168590 A | 8/2010 |
| JP | 04699897 B2 | 6/2011 |
| JP | 2011153309 A | 8/2011 |
| JP | 04874650 B2 | 2/2012 |
| WO | 0060010 A1 | 10/2000 |
| WO | 2007064624 | 6/2007 |
| WO | 2009106719 A1 | 9/2009 |
| WO | 2009106722 A1 | 9/2009 |
| WO | 2012134788 A1 | 10/2012 |
| WO | 2013013111 A1 | 1/2013 |

(56) References Cited

FOREIGN PATENT DOCUMENTS

| WO | 2013026654 | | 2/2013 |
|---|---|---|---|
| WO | 2013070227 | A1 | 5/2013 |
| WO | 2013117471 | | 5/2013 |
| WO | 2013142140 | | 9/2013 |

OTHER PUBLICATIONS

International Search Report and Written Opinion of the International Searching Authority, PCT/US2012/071351, Feb. 8, 2013.
Patel et al., "Impact of thermal ageing on the tin catalyst species in room temperature vulcanised polysiloxane rubbers", Polymer Degradation and Stability, 83 (2004) pp. 157-161.
Toynbee, "Silane crosslinking of polyolefins: observations on the tin catalyst employed", Polymer, vol. 35, No. 2, 1994.
Goddard et al., Principles of Polymer Science and Technology in Cosmetics and Personal Care, 1999, Chapter 7, Marcel Dekker, Inc., New York, New York.
Grzelka et al., "Polysilxanol condensation and disproportionation in the presence of a superacid", Journal of Organic Chemistry, vol. 689, Issue 4 (2004), 705-713.
Munirathinam, R. et al., "Gallium-containing polymer brush film as efficient supported Lewis acid catalyst in a glass microractor." Beilstein Journal of Organic Chemistry. vol. 9 2013. pp. 1698-1704.
Glasovac, Z et al. "Synthesis of Highly Basic Hexasubstituted Biguanides by Environmentally Friendly Methods" Synletl, Oct. 14, 2013, pp. 2540-2544.
Pubchem Substance Summary for CHEMBL 1083796 Deposit Date Dec. 22, 2010; Modify Date Feb. 4, 2013.
Pubchem Substance Summary for ST51001443 Create Date Sep. 18, 2005.
Chinese Patent Application No. 20128007079.X, First Office Action dated Aug. 3, 2015.
Klaes, Daphne, Extended European Search Report for Application 12863787.3 PCT/US2012071351, dated Jul. 16, 2015, 6 pgs., European Patent Office, Germany.

\* cited by examiner

MOISTURE CURABLE ORGANOPOLYSILOXANE COMPOSITION

CROSS REFERENCE TO RELATED APPLICATIONS

This application is a 35 U.S.C. 371 national stage filing and claims priority to PCT Application No. PCT/US2012/71351, entitled "Moisture Curable Organopolysiloxane Composition" filed on Dec. 21, 2012 which claims the benefit of U.S. Provisional Application No. 61/581,299 entitled "Moisture Curable Organopolysiloxane Composition" filed on Dec. 29, 2011, both of which are incorporated herein in their entirety by reference.

FIELD

The present invention relates to curable compositions comprising curable polymers having reactive terminal silyl groups and bismuth-based catalysts. In particular, the present invention provides curable compositions comprising bismuth(III) sulfonate complexes such as bismuth(III) camphorsulfonate and/or bismuth(III) methanesulfonate complexes as alternatives to organotin catalysts.

BACKGROUND

Polymers having reactive terminal silyl groups or compositions comprising such polymers can be hydrolyzed and condensed in the presence of water and metal catalysts. Suitable known catalysts for curable compositions include compounds employing metals such as Sn, Ti, Zn, or Ca. Organotin compounds such as, for example, dibutyltin dilaurate (DBTDL) are widely used as condensation cure catalysts to accelerate the moisture-assisted curing of a number of different polyorganosiloxanes and non-silicone polymers having reactive terminal silyl groups such as room temperature vulcanizing (RTV) formulations including RTV-1 and RTV-2 formulations. Environmental regulatory agencies and directives, however, have increased or are expected to increase restrictions on the use of organotin compounds in formulated products. For example, while formulations with greater than 0.5 wt. % dibutyltin presently require labeling as toxic with reproductive 1B classification, dibutyltin-containing formulations are proposed to be completely phased out in consumer applications during the next four to six years.

The use of alternative organotin compounds such as dioctyltin compounds and dimethyltin compounds can only be considered as a short-term remedial plan, as these organotin compounds may also be regulated in the future. It would be beneficial to identify non-tin metal catalysts that accelerate the condensation curing of moisture-curable silicones and non-silicones. Desirably, substitutes for organotin catalysts should exhibit properties similar to organotin compounds in terms of curing, storage, and appearance. Non-tin catalysts would also desirably initiate the condensation reaction of the selected polymers and complete this reaction upon the surface and may be in the bulk in a desired time schedule. There are therefore many proposals for the replacement of organometallic tin compounds with other metal-based compounds. These other metals have specific advantages and disadvantages in view of replacing tin compounds perfectly. Therefore, there is still a need to address the weaknesses of possible metal compounds as suitable catalysts for condensation cure reactions. The physical properties of uncured and cured compositions also warrant examination, in particular to maintain the ability to adhere onto the surface of several substrates.

The use of bismuth(III) complexes as catalysts in condensation curable silicone compositions has been described. U.S. Publication No. 2003/0069379 claims the use of trivalent bismuth carboxylates as curing catalysts in room-temperature-curing organopolysiloxane compositions. U.S. Publication Nos. 2011/0009558 and 2011/0021684 claims the use of bismuth(III) tris(monoallyl ethylene glycolate) and bismuth(III) tris(1,1,1,5,5,5-hexafluoropentanedionate) as catalysts, respectively, in curable organopolysiloxane compositions. U.S. Pat. No. 7,365,145 generically describes, among others, organobismuth compounds in a generic list of organic dibutyltin, zirconium complex, aluminum chelate, titanic chelate, organic zinc, organic cobalt, organic iron, and organic nickel as catalysts in moisture-curable silylated polymer composition. U.S. Pat. No. 5,194,489 describes the use of bismuth carboxylate as a hardening catalyst for a crosslinkable cyclopentenyl containing diorganopolysiloxane composition, which also comprises an inorganic filler. U.S. Publication No. 2009/0156737 describes, among others, Lewis acid compounds of bismuth in a generic list of Lewis acid compounds of Ti, Zr, Hf, Zn, B, and Al as catalysts in polymer blends comprising fillers and alkoxysilane-terminated polymers. Similar generic descriptions on the use of bismuth carboxylates in curable silicone composition are made in U.S. Publication No. 2009/306307. U.S. Pat. No. 7,504,468 describes the use of a mixture of metal-based compounds that include, among others, bismuth compounds as catalysts in single-component silicone compositions. U.S. Publication No. 2005/0137322 describes the use of a bismuth catalyst in a second component along with a polyol in a two component coating composition comprised of a compound containing trialkoxysilyl and isocyanate functional groups as a first component.

U.S. Pat. No. 4,293,597 includes bismuth salts of mono- or dicarboxylic acids in a generic list of metal salts including Pb, Sn, Zr, Sb, Cd, Ba, Ca, and Ti as catalysts in curable silicone rubber compositions that also contain nitrogen-functional silanes. U.S. Pat. No. 4,461,867 includes bismuth carboxylates in a generic list of metal carboxylates also including Sn, Pb, Zr, Sb, Cd, Ba, Ca, Ti, Mn, Zn, Cr, Co, Ni, Al, Ga, and Ge as catalysts in moisture-curable RTV-1 silicone compositions. U.S. Pub. No. 2011/0098420 includes, among others, bismuth compounds in a generic list also including compounds of Pt, Pd, Pb, Sn, Zn, Ti, and Zr, as dehydrogenative condensation reaction catalysts for a curable polysiloxane composition comprising siloxanes with 2 or more hydrosilyl groups and siloxanes with 2 or more silanol groups. U.S. Pat. No. 7,527,838 describes, among others, bismuth-based catalysts in a generic list that includes other metal catalysts based on Sn, Ti, Zr, Pb, Co, Sb, Mn, and Zn, in curable diorganopolysiloxane compositions used for making insulated glass units. U.S. Pub. No. 2011/0040033 describes the use of a commercially available bismuth triflate catalyst, among other metal triflates based on Sc, Yb, Cu, and Ag.

Despite these generic descriptions that group bismuth complexes together with other metal catalysts, there has not been provided any teachings or catalyst compositions that differentiate the catalytic activity exhibited by different bismuth complexes. Further, there has not been a replacement catalyst for organotin compounds that maintains its ability to cure when exposed to humidity or ambient air, after storage over months in a sealed cartridge. It is always a specific requirement for moisture-curable compositions to achieve the shortest possible curing times, showing a tack-free surface as well as curing through the complete bulk in thick section for RTV-1 and RTV-2 compositions. Additionally, such compositions should provide a reasonable adhesion after cure onto a variety of substrates.

While tin-based compounds are facing regulatory pressures, there are concerns over the toxicology of perfluoroalkyl compounds as well as their bioaccumulation. The U.S. Environmental Protection Agency (EPA) is proposing to tighten regulation of such perfluoroalkyl materials that have the potential of breaking down into toxic perfluoroalkyl carboxylates, such as perfluorooctanoic acid (PFOA), and perfluoroalkyl sulfonates, including perfluorooctanyl sulfonate (PFOS). These substances are expected to bioaccumulate, persist in the environment, and are likely to be "highly toxic". Also, studies suggest that perfluoroalkyl sulfonates and carboxylates may get released in the air when items made with certain fluoropolymers are burned in municipal waste incinerators. Accordingly, the identification of non-fluorinated, non-tin-based condensation catalysts that can avoid environmental and health concerns is of interest.

SUMMARY

The present invention provides tin-free, curable compositions comprising silyl-terminated polymers and a non-toxic condensation catalyst based on bismuth complexes. In particular, the present invention provides curable compositions employing a bismuth(III) sulfonate complex as a condensation catalyst. In one aspect, the bismuth(III)-based catalysts are complexes of the Formula (1):

$$Bi(O_3SR^9)_r(Q)_{3-r} \quad (1)$$

where $R^9$ is chosen from a linear alkyl, a branched alkyl, a cycloalkyl, a heteroaryl, an aralkyl, a branched aralkyl, a heteroalkyl, a heterocycloalkyl, a heteroaralkyl, an aryl, or a combination of two or more thereof, Q is an anionic ligand, and r is 1 to 3.

In one aspect, the curable composition comprises a bismuth(III) camphorsulfonate, complex, a bismuth(III) methanesulfonate complex, or a combination of thereof. In one embodiment, the bismuth(III) complex is of the Formula (1) wherein at least one $(O_3SR^9)$ group has an $R^9$ chosen from methyl and (7,7-dimethyl-2-oxobicyclo[2.2.1]heptan-1-yl) methyl. In one embodiment, r is 3 and $R^9$ is methyl. In another embodiment, r is 3 and $R^9$ is (7,7-dimethyl-2-oxobicyclo[2.2.1]heptan-1-yl)methyl In one embodiment, the present invention provides a curable composition comprising bismuth(III) sulfonate catalysts that are substantially free of tin and fluorine.

In one aspect, the invention provides a curable composition exhibiting a relatively short tack-free time, curing through the bulk, as well as long storage stability in the cartridge, i.e., in the absence of humidity. It has unexpectedly been found that bismuth(III) sulfonate compounds, including compounds of formula (1), exhibit curing behavior similar to or even better than organotin compounds, and are therefore suitable as replacements for organotin catalysts in compositions having a reactive, silyl-terminated polymer that can undergo condensation reactions such as in RTV-1 and RTV-2 formulations.

Curable compositions using bismuth(III) compounds may also exhibit certain storage stability of the uncured composition in the cartridge, adhesion onto several surfaces, and a cure rate in a predictable time scheme.

In one aspect, the present invention provides a composition for forming a cured polymer composition comprising: (A), a polymer having at least one reactive silyl group; (B), a crosslinker or chain extender chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alkoxyaminosiloxane, an alkoxycarbamatosilane, an alkoxycarbamatosiloxane, and combinations of two or more thereof; (C), a catalyst chosen from a bismuth(III) sulfonate; (D), optionally at least one adhesion promoter chosen from a silane or siloxane other than the compounds listed under (B); (E), optionally, a filler component; and (F), at least one acidic compound chosen from a phosphate ester, a phosphonate ester, a phosphonic acid, a phosphorous acid, a phosphite, a phosphonite ester, a sulfate, a sulfite, a pseudohalogenide, a branched $C_4$-$C_{25}$ alkyl carboxylic acid, or a combination of two or more thereof.

In one embodiment, the polymer (A) has the formula: $[R^1_aR^2_{3-a}Si—Z—]_n—X—Z—SiR^1_aR^2_{3-a}$. In another embodiment, X is chosen from a polyurethane; a polyester; a polyether; a polycarbonate; a polyolefin; a polyesterether; and a polyorganosiloxane having units of $R_3SiO_{1/2}$, $R_2SiO$, $RSiO_{3/2}$, and/or $SiO_2$, n is 0 to 100, a is 0 to 2, R and $R^1$ can be identical or different at the same silicon atom and chosen from $C_1$-$C_{10}$ alkyl; $C_1$-$C_{10}$ alkyl substituted with one or more of Cl, F, N, O, or S; a phenyl; $C_7$-$C_{16}$ alkylaryl; $C_7$-$C_{16}$ arylalkyl; $C_2$-$C_{20}$-polyalkylene ether; or a combination of two or more thereof. In yet another aspect, $R^2$ is chosen from OH, $C_1$-$C_8$ alkoxy, $C_2$-$C_{18}$ alkoxyalkyl, alkoxyaryl, oximoalkyl, oximoaryl, enoxyalkyl, enoxyaryl, aminoalkyl, aminoaryl, carboxyalkyl, carboxyaryl, amidoalkyl, amidoaryl, carbamatoalkyl, carbamatoaryl, or a combination of two or more thereof, and Z is a bond, a divalent unit selected from the group of a $C_1$-$C_{14}$ alkylene, or O.

According to one embodiment, the crosslinker component (B) is chosen from tetraethylorthosilicate (TEOS), methyltrimethoxysilane (MTMS), vinyltrimethoxysilane, methylvinyldimethoxysilane, dimethyldimethoxysilane, dimethyldiethoxysilane, vinyltriethoxysilane, tetra-n-propylorthosilicate, tris(methylethylketoximo)vinylsilane, tris(methylethylketoximo)methylsilane, tris(acetamido)methylsilane, bis(acetamido)dimethylsilane, tris(N-methylacetamido)methylsilane, bis(N-methylacetamido)dimethylsilane, (N-methylacetamido)methyldialkoxysilane, tris(benzamido)methylsilane, tris(propenoxy)methylsilane, alkyldialkoxyamidosilanes, alkylalkoxybisamidosilanes, methylethoxybis(N-methylbenzamido)silane, methylethoxydibenzamidosilane, methyldimethoxy(ethylmethylketoximo)silane; bis(ethylmethylketoximo)methylmethoxysilane; (acetaldoximo)methyldimethoxysilane; (N-methylcarbamato)methyldimethoxysilane; (N-methylcarbamato)ethyldimethoxy silane; (isopropenoxy)methyldimethoxysilane; (isopropenoxy)trimethoxysilane; tris(isopropenoxy)methylsilane; (but-2-en-2-oxy) methyldimethoxysilane; (1-phenylethenoxy) methyldimethoxysilane; 2-((1-carboethoxy)propenoxy) methyldimethoxysilane; bis(N-methylamino) methylmethoxysilane; (N-methylamino) vinyldimethoxysilane; tetrakis(N,N-diethylamino)silane; methyldimethoxy(N-methylamino)silane; methyltris(cyclohexylamino)silane; methyldimethoxy(N-ethylamino)silane; dimethylbis(N,N-dimethylamino)silane; methyl dimethoxy (N-isopropylamino)silane dimethylbis(N,N-diethylamino) silane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)

silane; methylmethoxybis(N-methylacetamido)silane; methyldimethoxy(ε-caprolactamo)silane; trimethoxy(N-methylacetamido)silane; methyldimethoxy(O-ethylacetimidato)silane; methyldimethoxy(O-propylacetimidato)silane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxy(isocyanato)silane; dimethoxydiisocyanatosilane; methyldimethoxyisothiocyanatosilane; methylmethoxydiisothiocyanatosilane; methyltriacetoxysilane; methylmethoxydiacetoxysilane; methylethoxydiacetoxysilane; methylisopropoxydiacetoxysilane; methyl(n-propoxy)diacetoxysilane; methyldimethoxyacetoxysilane; methyldiethoxyacetoxysilane; methyldiisopropoxyacetoxysilane; methyldi(n-propoxy)acetoxysilane; or the condensates thereof; or a combination of two or more thereof.

According to one embodiment, the adhesion promoter component (D) is chosen from an (aminoalkyl)trialkoxysilane, an (aminoalkyl)alkyldialkoxysilane, a bis(trialkoxysilylalkyl)amine, a tris(trialkoxysilylalkyl)amine, a tris(trialkoxysilylalkyl)cyanuarate, a tris(trialkoxysilylalkyl)isocyanurate, an (epoxyalkyl)trialkoxysilane, an (epoxyalkylether)trialkoxysilane, or a combination of two or more thereof.

According to one embodiment, the component (F) is chosen from a phosphate ester of the formula: $(R^3O)PO(OH)_2$; a phosphite ester of the formula $(R^3O)P(OH)_2$; or a phosphonic acid of the formula: $R^3P(O)(OH)_2$. In another aspect, $R^3$ is a $C_1$-$C_{18}$ alkyl, a $C_2$-$C_{20}$ alkoxyalkyl, phenyl, a $C_7$-$C_{12}$ alkylaryl, a $C_2$-$C_4$ polyalkylene oxide ester or its mixtures with diesters; a branched $C_4$-$C_{14}$ alkyl carboxylic acid; or a combination of two or more thereof.

According to one embodiment, the composition comprises about 1 to about 10 wt. % of the crosslinker component (B) based on 100 wt. % of the polymer component (A).

According to one embodiment, the crosslinker component (B) is chosen from a silane or a siloxane, the silane or siloxane having two or more reactive groups that can undergo hydrolysis and/or condensation reaction with polymer (A) or on its own in the presence of water and component (F).

According to one embodiment, the polymer component (A) is chosen from a polyorganosiloxane comprising divalent units of the formula [$R_2SiO$] in the backbone, wherein R is chosen from $C_1$-$C_{10}$ alkyl; $C_1$-$C_{10}$ alkyl substituted with one or more of Cl, F, N, O, or S; phenyl; $C_7$-$C_{16}$ alkylaryl; $C_7$-$C_{16}$ arylalkyl; $C_2$-$C_{20}$ polyalkylene ether; or a combination of two or more thereof.

According to one embodiment, the catalyst (C) is present in an amount of from about 0.1 to about 7 wt. pt. per 100 wt. pt. of component (A).

According to one embodiment, the component (F) is present in an amount of from about 0.02 to about 7 wt. pt. per 100 wt. pt. of component (A).

According to one embodiment, the polymer component (A) has the formula: $R^2_{3-a}R^1_aSi$—Z—[$R_2SiO$]$_x$-[$R^1_2SiO$]$_y$—Z—$SiR^1_aR^2_{3-a}$ whereby x is 0 to 10000; y is 0 to 1000; a is 0 to 2; R is methyl. In another aspect, R' is chosen from a $C_1$-$C_{10}$ alkyl; a $C_1$-$C_{10}$ alkyl substituted with one or more of Cl, F, N, O, or S; a phenyl; a $C_7$-$C_{16}$ alkylaryl; a $C_7$-$C_{16}$ arylalkyl; a $C_2$-$C_{20}$ polyalkylene ether; or a combination of two or more thereof, and other siloxane units may be present in amounts less than 10 mol. % preferably methyl, vinyl, phenyl. In yet another embodiment, $R^2$ is chosen from OH, a $C_1$-$C_8$ alkoxy, a $C_2$-$C_{18}$ alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is —O—, a bond, or $C_2H_4$.

According to one embodiment, the composition further comprises a solvent chosen from an alkylbenzene, a trialkylphosphate, a triarylphosphate, a phthalic acid ester, an arylsulfonic acid ester having a viscosity-density constant (VDC) of at least 0.86 that is miscible with a polyorganosiloxane and catalyst component (C), a polyorganosiloxane devoid of reactive groups and having a viscosity of less than 2000 mPa·s at 25° C., or a combination of two or more thereof.

According to one embodiment, the composition is provided as a one-part composition.

According to one embodiment, the composition comprises 100 pt. wt. of component (A), 0.1 to about 10 pt. wt. of at least one crosslinker (B), 0.01 to about 7 pt. wt. of a catalyst (C), 0.1 to about 5 pt. wt. of an adhesion promoter (D), 0 to about 300 pt. wt. of component (E), 0.01 to about 8 pt. wt. of component (F) whereby this composition can be stored in the absence of humidity and is curable in the presence of humidity upon exposure to ambient air.

According to one embodiment, the composition is a two-part composition comprising: (i) a first portion comprising the polymer component (A), optionally the filler component (E), and optionally the acidic compound (F); and (ii) a second portion comprising the crosslinker (B), the catalyst component (C), the adhesion promoter (D), and the acidic compound (F), whereby (i) and (ii) are stored separately until applied for curing by mixing of the components (i) and (ii).

According to one embodiment, portion (i) comprises 100 wt. % of component (A), and 0 to 70 pt. wt. of component (E); and portion (ii) comprises 0.1 to 10 pt. wt. of at least one crosslinker (B), 0.01 to 7 pt. wt. of a catalyst (C), 0 to 5 pt. wt. of an adhesion promoter (D), and 0.02 to 3 pt. wt. component (F).

In another aspect, the present invention provides, a composition for forming a cured polymer composition comprising (A) a polymer having at least a reactive silyl group, where the polymer is free of siloxane bonds; (B) a crosslinker or chain extender chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alklarylaminosiloxane, an alkoxycarbamatosilane, an alkoxycarbamatosiloxane, the condensates thereof, and combinations of two or more thereof; and (C) a condensation catalyst comprising a bismuth(III) sulfonate.

In one embodiment, the bismuth(III) sulfonate complex of the formula (1):

$$Bi(O_3SR^9)_r(Q)_{3-r} \qquad (1)$$

where $R^9$ is chosen from a linear alkyl, a branched alkyl, a cycloalkyl, a heteroaryl, an aralkyl, a branched aralkyl, a heteroalkyl, a heterocycloalkyl, a heteroaralkyl, an aryl, or a combination of two or more thereof, Q is an anionic ligand, and r is 1-3.

In one embodiment, the composition comprises from about 0.001 to about 7 parts per weight of catalyst component (C) per 100 parts per weight of the polymer (A); from about 0.01 to about 7 parts per weight catalyst (C) per 100 parts per weight of the polymer (A); even from about 0.005 to about 0.05 wt. pt. of catalyst component (C) per 100 parts of component.

In one embodiment, the polymer (A) is chosen from a silylated polyurethane (SPUR), a silylated polyester, a silylated polyether, a silylated polycarbonate, a silylated polyolefin, a silylated polyesterether, or a combination of two or more thereof.

In one embodiment, $R^9$ is chosen from an alkyl, an aryl, an aralkyl, a cycloalkyl, or a combination of two or more thereof; and Q is chosen from an alkyl, an aryl, an aralkyl, a cycloalkyl, or a combination of two or more thereof.

In one embodiment, $R^9$ is chosen from an alkyl, a cycloalkyl, an aryl, an aralkyl, or a combination thereof, and Q is a hydroxyl.

In one embodiment, $R^9$ is chosen from an alkyl, a cycloalkyl, an aryl, an aralkyl, or a combination of two or more thereof.

In one embodiment, at least one $(O_3SR^9)$ group comprises a $R^9$ chosen from a spirocyclic compound, a fused cyclic compound, a bridged cyclic compound, or combination of two or more thereof.

In one embodiment, at least one $(O_3SR^9)$ group comprises a $R^9$ chosen from methyl or (7,7-dimethyl-2-oxobicyclo[2.2.1]heptan-1-yl)methyl.

In another aspect, the present invention provides a method of providing a cured material comprising exposing the composition to ambient air.

According to one embodiment, a method of providing a cured material comprises combining the first portion and the second portion and curing the mixture.

According to one embodiment, the composition is stored in a sealed cartridge or flexible bag having outlet nozzles for extrusion and/or shaping of the uncured composition prior to cure.

In still another aspect, the present invention provides a cured polymer material formed from the compositions.

According to one embodiment, the cured polymer material is in the form of an elastomeric or duromeric seal, an adhesive, a coating, an encapsulant, a shaped article, a mold, or an impression material.

The compositions are found to exhibit good storage stability and adhere to a variety of surfaces. In one embodiment, the curable compositions exhibit excellent adherence to thermoplastic surfaces, including polyacrylate and polymethylmethacrylate (PMMA) surfaces. The bismuth complexes featuring sulfonate such as camphorsulfonate or methanesulfonate groups have been found to provide greater control over the catalysis as compared to the use of bismuth trifluoromethanesulfonate. As bismuth triflate typically exhibits a short tack-free time and deep section cure time, it is capable of such rapid curing that it can be difficult to work with in a practical sense. Though this problem is typically addressed by adjusting the catalyst concentration, it has been found that bismuth triflate possesses a narrow loading tolerance (read: small operating window). As such, tuning surface cure or tack-free time is challenging. The present bismuth(III) complexes comprising alkyl- and arylsulfonate ligands have been found to allow for modulating the reactivity of the bismuth complex and provide greater control over the cure behavior of the composition. This is manifested in the linearity of the concentration against the tack-free time curves. The attenuated activity of the current invention allows the user a broader range of catalyst loadings for tuning cure time in a predictable and controllable fashion. Further, bismuth triflate is a highly reactive catalyst such that shelf stability could be an issue. It has been found that the shelf stability of bismuth alkylsulfonates and bismuth arylsulfonates is superior to that of bismuth triflate and parallels that of tin-based compounds.

DETAILED DESCRIPTION

Figure 1:
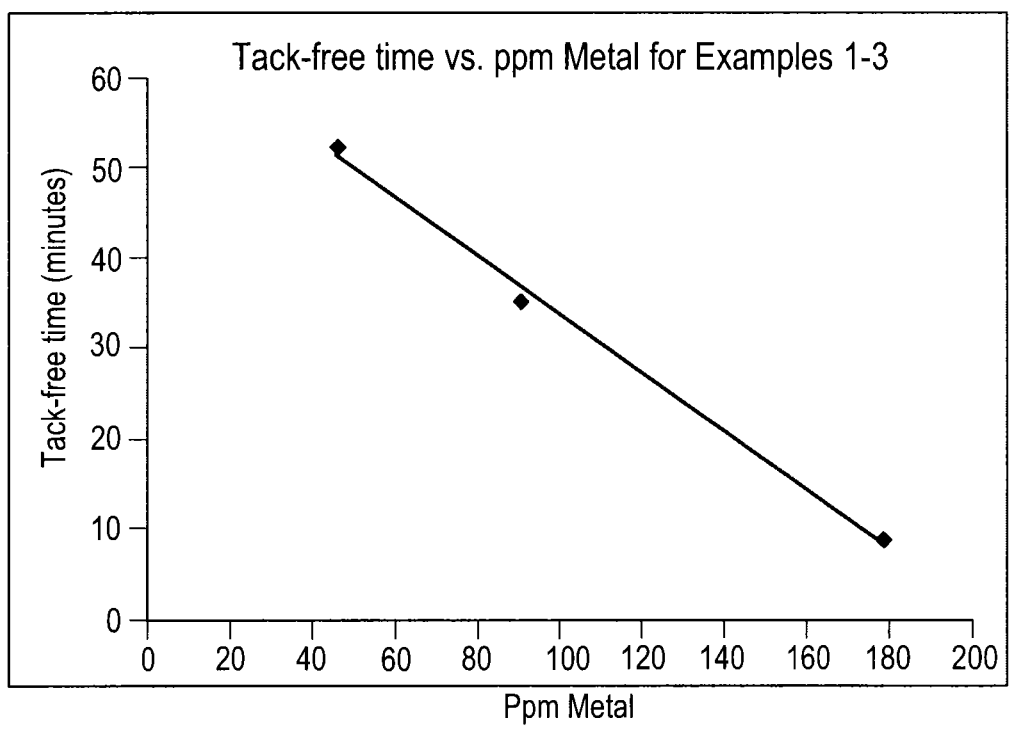
FIG. 1 is a graph showing tack-free time versus metal concentration for catalyst composition in accordance with aspects of the present technology.

The present invention provides a curable composition employing a bismuth(III) complex as a condensation catalyst. The bismuth(III) complexes identified in the present invention exhibit similar or superior curing properties as compared to compositions employing organotin compounds, such as DBTDL, in terms of accelerating moisture-assisted condensation curing of silicones to result in cross-linked silicones that can be used as sealants and RTVs (Room-Temperature Vulcanized Rubber). Further, the sulfonyl-containing bismuth(III) complexes identified in the present invention also exhibit improved storage stability relative to previously reported bismuth(III) complexes. The non-toxic nature of these bismuth compounds makes them more attractive and practical than organotin catalysts, given the forthcoming strict regulations on organotin catalysts.

In one embodiment, the present invention provides a curable composition comprising a polymer component (A) comprising a reactive terminal silyl group; a crosslinker component (B); a catalyst component (C) comprising a bismuth(III) complex; optionally an adhesion promoter component (D); an optional filler component (E); and optionally an acidic compound (F), and optionally auxiliary components (G).

The polymer component (A) may be a liquid- or solid-based polymer having a reactive terminal silyl group. The polymer component (A) is not particularly limited and may be chosen from any crosslinkable polymer as may be desired for a particular purpose or intended use. Non-limiting examples of suitable polymers for the polymer component (A) include polyorganosiloxanes (A1) or organic polymers free of siloxane bonds (A2), wherein the polymers (A1) and (A2) comprise reactive terminal silyl groups. In one embodiment, the polymer component (A) may be present in an amount of from about 10 to about 90 wt. % of the curable composition. In one embodiment, the curable composition comprises about 100 pt. wt. of the polymer component (A).

As described above, the polymer component (A) may include a wide range of polyorganosiloxanes. In one embodiment, the polymer component may comprise one or more polysiloxanes and copolymers of formula (2):

$$[R^1_cR^2_{3-c}Si\text{—}Z\text{-}]_n\text{—}X\text{—}Z\text{—}SiR^1_cR^2_{3-c} \quad (2)$$

$R^1$ may be chosen from linear or branched alkyl, linear or branched heteroalkyl, cycloalkyl, heterocycloalkyl, aryl, heteroaryl, linear or branched aralkyl, linear or branched heteroaralkyl, or a combination of two or more thereof. In one embodiment, $R^1$ may be chosen from $C_1$-$C_{10}$ alkyl; $C_1$-$C_{10}$ alkyl substituted with one or more of Cl, F, N, O, or S; phenyl; $C_7$-$C_{16}$ alkylaryl; $C_7$-$C_{16}$ arylalkyl; $C_2$-$C_{20}$ polyalkylene ether; or a combination of two or more thereof. Exemplary preferred groups are methyl, trifluoropropyl, and/or phenyl groups.

$R^2$ may be a group reactive to protic agents such as water. Exemplary groups for $R^2$ include OH, alkoxy, alkenyloxy, alkyloximo, alkylcarboxy, arylcarboxy, alkylamido, arylamido, or a combination of two or more thereof. In one embodiment, $R^2$ is chosen from OH, $C_1$-$C_8$ alkoxy, $C_2$-$C_{18}$ alkoxyalkyl, amino, alkenyloxy, alkyloximo, alkylamino, arylamino, alkylcarboxy, arylcarboxy, alkylamido, arylamido, alkylcarbamato, arylcarbamato, or a combination of two or more thereof.

Z may be a bond, a divalent linking unit selected from the group of 0, hydrocarbons which can contain one or more O, S, or N atom, amide, urethane, ether, ester, urea units or a combination of two or more thereof. If the linking group Z is a hydrocarbon group, then Z is linked to the silicon atom over a silicon-carbon bond. In one embodiment, Z is chosen from a $C_1$-$C_{14}$ alkylene.

X is chosen from a polyurethane; a polyester; a polyether; a polycarbonate; a polyolefin; a polyesterether; and a polyorganosiloxane having units of $R^1_3SiO_{1/2}$, $R^1_2SiO$, $R^1SiO_{3/2}$, and/or $SiO_2$, where $R^1$ is defined as above. X may be a divalent or multivalent polymer unit selected from the group of siloxy units linked over oxygen or hydrocarbon groups to the terminal silyl group comprising the reactive group $R^2$ as described above, polyether, alkylene, isoalkylene, polyester, or polyurethane units linked over hydrocarbon groups to the silicon atom comprising one or more reactive groups $R^2$ as described above. The hydrocarbon group X can contain one or more heteroatoms such as N, S, O, or P forming amides, esters, ethers, urethanes, esters, and/or ureas. In one embodiment, the average polymerization degree ($P_n$) of X should be more than 6, e.g. polyorganosiloxane units of $R^1_3SiO_{1/2}$, $R^1_2SiO$, $R^1SiO_{3/2}$, and/or $SiO_2$. In formula (2), n is 0 to 100; desirably 1, and c is 0 to 2, desirably 0 to 1.

Non-limiting examples of the components for unit X include polyoxyalkylene polymers such as polyoxyethylene, polyoxypropylene, polyoxybutylene, polyoxyethylene-polyoxypropylene copolymer, polyoxytetramethylene, or polyoxypropylene-polyoxybutylene copolymer; ethylene-propylene copolymer, polyisobutylene, polychloroprene, polyisoprene, polybutadiene, copolymer of isobutylene and isoprene, copolymers of isoprene or butadiene and acrylonitrile and/or styrene, or hydrocarbon polymers such as hydrogenated polyolefin polymers produced by hydrogenating these polyolefin polymers; polyester polymer manufactured by a condensation of dibasic acid such as adipic acid or phthalic acid and glycol, or ring-opening polymerization of lactones; polyacrylic acid ester produced by radical polymerization of a monomer such as $C_2$-$C_8$-alkyl acrylates, vinyl polymers, e.g., acrylic acid ester copolymer of acrylic acid ester such as ethyl acrylate or butyl acrylate and vinyl acetate, acrylonitrile, methyl methacrylate, acrylamide, or styrene; graft polymer produced by polymerizing the above organic polymer with a vinyl monomer; polycarbonates; polysulfide polymer; polyamide polymer such as Nylon 6 produced by ring-opening polymerization of ε-caprolactam, Nylon 6-6 produced by polycondensation of hexamethylenediamine and adipic acid, etc., Nylon 12 produced by ring-opening polymerization of ε-laurolactam, copolymeric polyamides, polyurethanes, or polyureas.

Particularly suitable polymers include, but are not limited to, polysiloxanes, polyoxyalkylenes, saturated hydrocarbon polymers such as polyisobutylene, hydrogenated polybutadiene and hydrogenated polyisoprene, or polyethylene, polypropylene, polyesters, polycarbonates, polyurethanes, polyurea polymers and the like. Furthermore, saturated hydrocarbon polymer, polyoxyalkylene polymer, and vinyl copolymer are particularly suitable due to their low glass transition temperature which provide a high flexibility at low temperatures, i.e., below 0° C.

The reactive silyl groups in formula (2) can be introduced by employing silanes containing a functional group which has the ability to react by known methods with unsaturated hydrocarbons via hydrosilylation, or reaction of SiOH, aminoalkyl or -aryl, HOOC-alkyl or -aryl, HO-alkyl or -aryl, HS-alkyl or -aryl, Cl(O)C-alkyl or -aryl, epoxyalkyl or epoxycycloalkyl groups in the prepolymer to be linked to a reactive silyl group via condensation or ring-opening reactions. Examples of the main embodiments include the following: (i) siloxane prepolymers having a SiOH group that can undergo a condensation reaction with a silane (LG) $SiR^1_cR^2_{3-c}$ whereby a siloxy bond $\equiv Si-O-SiR^1_cR^2_{3-c}$ is formed while the addition product of the leaving group (LG) and hydrogen is released (LG-H); (ii) silanes having an unsaturated group that is capable of reacting via hydrosilylation or radical reaction with a SiH group or radically activated groups of a silane such as SiH or an unsaturated group; and (iii) silanes including organic or inorganic prepolymers having OH, SH, amino, epoxy, —COCl, —COOH groups, which can react complementarily with epoxy, isocyanato, OH, SH, cyanato, carboxylic halogenides, reactive alkylhalogenides, lactones, lactams, or amines, that is to link the reactive prepolymer with the organofunctional silanes to yield a silyl functional polymer.

Silanes suitable for method (i) include alkoxysilanes, especially tetraalkoxysilanes, di- and trialkoxysilanes, di- and triacetoxysilanes, di- and triketoximosilanes, di- and trialkenyloxysilanes, di- and tricarbonamidosilanes, wherein the remaining residues at the silicon atom of the silane are substituted or unsubstituted hydrocarbons. Other non-limiting silanes for method (i) include alkyltrialkoxysilanes, such as vinyltrimethoxysilane, methyltrimethoxysilane, propyltrimethoxysilane, aminoalkyltrimethoxysilane, ethyltriacetoxysilane, methyl- or propyltriacetoxysilane, methyltributanonoximosilane, methyltripropenyloxysilane, methyltribenzamidosilane, or methyltriacetamidosilane. Prepolymers suitable for reaction under method (i) are SiOH-terminated polyalkylsiloxanes, which can undergo a condensation reaction with a silane having hydrolyzable groups attached to the silicon atom. Exemplary SiOH-terminated polyalkyldisiloxanes include polydimethylsiloxanes.

Suitable silanes for method (ii) include alkoxysilanes, especially trialkoxysilanes ($HSi(OR)_3$) such as trimethoxysilane, triethoxysilane, methyldiethoxysilane, methyldimethoxysilane, and phenyldimethoxysilane. Hydrogenchlorosilanes are in principle possible but are less desirable due to the additional replacement of the halogen through an alkoxy, acetoxy group, etc. Other suitable silanes include organofunctional silanes having unsaturated groups which can be activated by radicals, such as vinyl, allyl, mercaptoalkyl, or acrylic groups. Non-limiting examples include vinyltrimethoxysilane, mercaptopropyltrimethoxysilane, and methacryloxypropyltrimethoxysilane. Prepolymers suitable for reaction under method (ii) include vinyl-terminated polyalkylsiloxanes, preferably polydimethylsiloxanes, hydrocarbons with unsaturated groups which can undergo hydrosilylation or can undergo radically induced grafting reactions with a corresponding organofunctional group of a silane comprising, for example, unsaturated hydrocarbon or a SiH group.

Another method for introducing silyl groups into hydrocarbon polymers can be the copolymerization of unsaturated hydrocarbon monomers with the unsaturated groups of silanes. The introduction of unsaturated groups into a hydrocarbon prepolymer may include, for example, the use of alkenyl halogenides as chain stopper after polymerization of the silicon free hydrocarbon moiety.

Desirable reaction products between the silanes and prepolymers include the following structures:

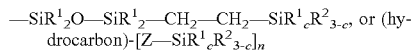, or (hydrocarbon)-[Z—SiR$^1_c$R$^2_{3-c}$]$_n$

Suitable silanes for method (iii) include, but are not limited to, alkoxysilanes, especially silanes having organofunctional groups to be reactive to —OH, —SH, amino, epoxy, —COCl, or COOH.

In one embodiment, these silanes have an isocyanatoalkyl group such as gamma-isocyanatopropyltrimethoxysilane, gamma-isocyanatopropylmethyldimethoxysilane, gamma-isocyanatopropyltriethoxysilane, gamma-glycidoxypropylethyldimethoxysilane, gamma-glycidoxypropyltrimethoxysilane, gamma-glycidoxypropyltriethoxysilane, beta-(3,4-epoxycyclohexyl)ethyltrimethoxysilane, beta-(3,4-epoxycyclohexyl)ethyltriethoxysilane, epoxylimonyltrimethoxysilane, N-(2-amino ethyl)-aminopropyltrimethoxysilane, gamma-aminopropyltriethoxysilane, gamma-aminopropyltrimethoxysilane, gamma-aminopropylmethyldimethoxysilane, gamma-aminopropylmethyldiethoxysilane, etc.

In one embodiment, it is desirable to select either blocked amines or isocyanates (Z'—X)$_n$—Z' for carrying out first a complete mixing and then the following coupling reaction. Examples of blocking agents are disclosed in EP 0947531 and other blocking procedures that employ heterocyclic nitrogen compounds such as caprolactam or butanone oxime, or cyclic ketones referred to in U.S. Pat. No. 6,827,875 both of which are incorporated herein by reference in their entirety.

Examples of suitable prepolymers for a reaction under method (iii) include, but are not limited to, polyalkylene oxides having OH groups, preferably with a high molecular weight (M$_w$, weight-average molecular weight >6000 g/mol) and a polydispersity M$_w$/M$_n$ of less than 1.6; urethanes having remaining NCO groups, such as NCO functionalized polyalkylene oxides, especially blocked isocyanates. Prepolymers selected from the group of hydrocarbons having OH, —COOH, amino, epoxy groups, which can react complementarily with an epoxy, isocyanato, amino, carboxyhalogenide or halogenalkyl group of the corresponding silane having further reactive groups useful for the final cure.

Suitable isocyanates for the introduction of a NCO group into a polyether may include toluene diisocyanate, diphenylmethane diisocyanate, or xylene diisocyanate, or aliphatic polyisocyanate such as isophorone diisocyanate, or hexamethylene diisocyanate.

The polymerization degree of the unit X depends on the requirements of viscosity and mechanical properties of the cured product. If X is a polydimethylsiloxane unit, the average polymerization degree based on the number average molecular weight M. is preferably 7 to 5000 siloxy units, preferably 200 to 2000 units. In order to achieve a sufficient tensile strength of >5 MPa, an average polymerization degree P$_n$ of >250 is suitable whereby the polydimethylsiloxanes have a viscosity of more than 300 mPa·s at 25° C. If X is a hydrocarbon unit other than a polysiloxane unit, the viscosity with respect to the polymerization degree is much higher.

Examples of the method for synthesizing a polyoxyalkylene polymer include, but are not limited to, a polymerization method using an alkali catalyst such as KOH, a polymerization method using a metal-porphyrin complex catalyst such as a complex obtained by reacting an organoaluminum compound, a polymerization method using a composite metal cyanide complex catalyst disclosed, e.g., in U.S. Pat. Nos. 3,427,256; 3,427,334; 3,278,457; 3,278,458; 3,278,459; 3,427,335; 6,696,383; and 6,919,293.

If the group X is selected from hydrocarbon polymers, then polymers or copolymers having isobutylene units are particularly desirable due to its physical properties such as excellent weatherability, excellent heat resistance, and low gas and moisture permeability.

Examples of the monomers include olefins having 4 to 12 carbon atoms, vinyl ether, aromatic vinyl compound, vinylsilanes, and allylsilanes. Examples of the copolymer component include 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, alpha-methylstyrene, dimethylstyrene, beta-pinene, indene, and for example, but not limited to, vinyltrialkoxysilanes, e.g. vinyltrimethoxysilane, vinylmethyldichlorosilane, vinyldimethylmethoxysilane, divinyldichlorosilane, divinyldimethoxysilane, allyltrichlorosilane, allylmethyldichlorosilane, allyldimethylmethoxysilane, diallyldichlorosilane, diallyldimethoxysilane, gamma-methacryloyloxypropyltrimethoxysilane, and gamma-methacryloyloxypropylmethyldimethoxysilane.

Examples of suitable siloxane-free organic polymers include, but are not limited to, silylated polyurethane (SPUR), silylated polyester, silylated polyether, silylated polycarbonate, silylated polyolefins like polyethylene, polypropylene, silylated polyesterether and combinations of two or more thereof. The siloxane-free organic polymer may be present in an amount of from about 10 to about 90 wt. % of the composition or about 100 pt. wt.

In one embodiment, the polymer component (A) may be a silylated polyurethane (SPUR). Such moisture curable compounds are known in the art in general and can be obtained by various methods including (i) reacting an isocyanate-terminated polyurethane (PUR) prepolymer with a suitable silane, e.g., one possessing both hydrolyzable functionality at the silicon atom, such as, alkoxy, etc., and secondly active hydrogen-containing functionality such as mercaptan, primary or secondary amine, preferably the latter, etc., or by (ii) reacting a hydroxyl-terminated PUR (polyurethane) prepolymer with a suitable isocyanate-terminated silane, e.g., one possessing one to three alkoxy groups. The details of these reactions, and those for preparing the isocyanate-terminated and hydroxyl-terminated PUR prepolymers employed therein can be found in, amongst others: U.S. Pat. Nos. 4,985,491; 5,919,888; 6,207,794; 6,303,731; 6,359,101; and 6,515,164, and published U.S. Patent Publication Nos. 2004/0122253 and US 2005/0020706 (isocyanate-terminated PUR prepolymers); U.S. Pat. Nos. 3,786,081 and 4,481,367 (hydroxyl-terminated PUR prepolymers); U.S. Pat. Nos. 3,627,722; 3,632,557; 3,971,751; 5,623,044; 5,852,137; 6,197,912; and 6,310,170 (moisture-curable SPUR (silane modified/terminated polyurethane) obtained from reaction of isocyanate-terminated PUR prepolymer and reactive silane, e.g., aminoalkoxysilane); and, U.S. Pat. Nos. 4,345,053; 4,625,012; 6,833,423; and published U.S. Patent Publication 2002/0198352 (moisture-curable SPUR obtained from reaction of hydroxyl-terminated PUR prepolymer and isocyanatosilane). The entire contents of the foregoing U.S. patent documents are incorporated by reference herein. Other examples of moisture-curable SPUR materials include those described in U.S. Pat. No. 7,569,653, the disclosure of which is incorporated by reference in its entirety.

In one embodiment, the polymer component (A) may be a polymer of formula (3):

$$R^2_{3-c}R^1_cSi\text{—}Z\text{—}[R_2SiO]_x[R^1_2SiO]_y\text{—}Z\text{—}SiR^1_cR^2_{3-c} \quad (3)$$

where $R^1$, $R^2$, Z, and c are defined as above with respect to formula (3); R is $C_1$-$C_6$ alkyl (an exemplary alkyl being methyl); x is 0 to about 10,000, in one embodiment from 11 to about 2500; and y is 0 to about 10,000; preferably 0 to 500. In one embodiment, Z in a compound of formula (3) is a bond or a divalent $C_1$-$C_{14}$ alkylene group, especially preferred is —$C_2H_4$—.

In one embodiment, the polymer component (A) may be a polyorganosiloxane of the formula (4):

$$R^2_{3-e-f}SiR^3_eR^4_f\text{—}[OSiR^3R^4]_x\text{—}[OSiR^3R^4]_y\text{—}OSiR^3_eR^4_fR^2_{3-e-f} \quad (4)$$

$R^3$ and $R^4$ can be identical or different on the same silicon atom and are chosen from hydrogen; $C_1$-$C_{10}$ alkyl; $C_1$-$C_{10}$ heteroalkyl, $C_3$-$C_{12}$ cycloalkyl; $C_2$-$C_{30}$ heterocycloalkyl; $C_6$-$C_{13}$ aryl; $C_7$-$C_{30}$ alkylaryl; $C_7$-$C_{30}$ arylalkyl; $C_4$-$C_{12}$ heteroaryl; $C_5$-$C_{30}$ heteroarylalkyl; $C_5$-$C_{30}$ heteroalkylaryl; $C_2$-$C_{100}$ polyalkylene ether; or a combination of two or more thereof. $R^2$, c, x, and y are as defined above; d is 0, 1, or 2; e is 0, 1, or 2; and f is 0, 1, or 2.

Non-limiting examples of suitable polysiloxane-containing polymers (A1) include, for example, silanol-stopped polydimethylsiloxane, silanol or alkoxy-stopped polyorganosiloxanes, e.g., methoxystopped polydimethylsiloxane, alkoxy-stopped polydimethylsiloxane-polydiphenylsiloxane copolymer, and silanol or alkoxy-stopped fluoroalkyl-substituted siloxanes such as poly(methyl 3,3,3-trifluoropropyl) siloxane and poly(methyl 3,3,3-trifluoropropyl)siloxane-polydimethyl siloxane copolymer. The polyorganosiloxane component (A1) may be present in an amount of about 10 to about 90 wt. % of the composition or 100 pt. wt. In one preferred embodiment, the polyorganosiloxane component has an average chain length in the range of about 10 to about 2500 siloxy units, and the viscosity is in the range of about 10 to about 500,000 mPa·s at 25° C.

Alternatively, the composition may include silyl-terminated organic polymers (A2) that are free of siloxane units, and which undergo curing by a condensation reaction comparable to that of siloxane containing polymers (A1). Similar to the polyorganosiloxane polymer (A1), the organic polymers (A2) that are suitable as the polymer component (A) include a terminal silyl group. In one embodiment, the terminal silyl group may be of the formula (5):

$$\text{—}SiR^1_dR^2_{3-d} \quad (5)$$

where $R^1$, $R^2$, and d are as defined above.

The polysiloxane composition may further include a crosslinker or a chain extender as component (B). In one embodiment, the crosslinker is of the formula (6):

$$R^1_dSiR^2_{4-d} \quad (6)$$

wherein $R^1$, $R^2$, and d are as defined above. Alternatively, the crosslinker component may be a condensation product of formula (6) wherein one or more but not all $R^2$ groups are hydrolyzed and released in the presence of water and then intermediate silanols undergo a condensation reaction to give a Si—O—Si bond and water. The average polymerization degree can result in a compound having 2 to 10 Si units.

In one embodiment, the crosslinker is an alkoxysilane having a formula $R^3_d(R^1O)_{4-d}Si$, wherein $R^1$, $R^3$, and d are defined as above. In another embodiment, the crosslinker is an acetoxysilane having a formula $(R^3_d(R^1CO_2)_{4-d}Si$, wherein $R^1$, $R^3$, and d are defined as above. In still another embodiment, the crosslinker is an oximosilane having a formula $R^3_d(R^1R^4C=N\text{—}O)_{4-d}Si$, where $R^1$, $R^3$, $R^4$, and d are defined as above.

As used herein, the term crosslinker includes a compound including an additional reactive component having at least two hydrolysable groups and less than three silicon atoms per molecule not defined under (A). In one embodiment, the crosslinker or chain extender may be chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alkylarylaminosiloxane, an alkoxycarbamatosilane, an alkoxycarbamatosiloxane, an imidatosilane, a ureidosilane, an isocyanatosilane, a isothiocyanatosilane, the condensates thereof and combinations of two or more thereof. Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoximo) silane; vinyltris(methylethylketoximo)silane; 3,3,3-trifluoropropyltris(methylethylketoximo)silane; methyltris (isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis(ethylmethylketoximo)silane; methyldimethoxy(acetaldoximo)silane; methyldimethoxy(N-methylcarbamato)silane; ethyldimethoxy(N-methylcarbamato)silane; methyl dimethoxyisopropenoxysilane; trimethoxyisopropenoxysilane; methyltriisopropenoxysilane; methyldimethoxy(but-2-en-2-oxy)silane; methyl dimethoxy(1-phenylethenoxy)silane; methyldimethoxy-2-(1-carboethoxypropenoxy)silane; methylmethoxydi(N-methylamino)silane; vinyldimethoxy(methylamino)silane; tetra-N,N-diethylaminosilane; methyldimethoxy(methylamino)silane; methyltri(cyclohexylamino)silane; methyl dimethoxy(ethylamino)silane; dimethyldi(N,N-dimethylamino)silane; methyldimethoxy (isopropylamino)silane; dimethyldi(N,N-diethylamino)silane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido) silane; methylmethoxybis(N-methylacetamido)silane; methyldimethoxy(caprolactamo)silane; trimethoxy(N-methylacetamido)silane; methyldimethoxy(ethylacetimidato)silane; methyldimethoxy(propylacetimidato)silane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxyisothiocyanatosilane; methylmethoxydiisothiocyanatosilane, the condensates thereof, or combinations of two or more thereof. In one embodiment, the crosslinker may be present in an amount from about 1 to about 10 wt. % of the composition or from about 0.1 to about 10 pt. wt. per 100 pt. wt. of the polymer component (A). In another embodiment, the crosslinker may be present in an amount from about 0.1 to about 5 pt. wt. per 100 pt. wt. of the polymer component (A). In still another embodiment, the crosslinker may be present in an amount from about 0.5 to about 3 pt. wt. per 100 pt. wt. of the polymer component (A). Here as elsewhere in the specification and claims, numerical values may be combined to form new or undisclosed ranges.

Additional alkoxysilanes in an amount greater than 0.1 wt. % of component (A) that are not consumed by the reaction between the prepolymer Z'—X—Z' and which comprise additional functional groups selected from $R^5$ can also work as an adhesion promoter and are defined and counted under component (D).

The curable compositions further comprise a metal catalyst or metal catalyst system (C) comprising a bismuth(III) complex. It has unexpectedly been found that bismuth(III) complexes exhibit excellent catalytic activity and are found to work satisfactorily in most of the compositions, e.g., typical sealant RTV-1 or RTV-2 formulations, comprising polymers having reactive terminal groups, which may additionally contain other ingredients. In comparison to DBTDL, which is a free flowing liquid, the bismuth(III) complexes may be either solid or liquid in nature. In the case of solid bismuth(III) complexes, these are usually dispersed with the aid of an organic solvent.

In one embodiment, the catalyst component (C) comprises a bismuth(III) camphorsulfonate complex, a bismuth (III) methanesulfonate, or a combination thereof. In one embodiment, the catalyst component (C) comprises a bismuth(III) complex of the formula (1):

$$Bi(O_3SR^9)_r(Q)_{3-r} \qquad (1)$$

wherein at least one $(O_3SR^9)$ group includes an $R^9$ group chosen from methyl and (7,7-dimethyl-2-oxobicyclo[2.2.1] heptan-1-yl)methyl; Q is an anionic ligand; and r is 1 to 3. In one embodiment, the catalyst is of the formula $Bi(O_3SR^9)_3$.

While the catalyst includes at least on Bi(III) complex where at least one $(O_3SR^9)$ group has a $R^9$ chosen from methyl or (7,7-dimethyl-2-oxobicyclo[2.2.1]heptan-1-yl) methyl, it will be appreciated that the bismuth complex can include $(O_3SR^9)$ groups with a different $R^9$ or the catalyst system can include other bismulth sulfonate materials with other $R^9$ groups. Examples of other $R^9$ groups include linear alkyl, branched alkyl, cycloalkyl, heteroaryl, aralkyl, branched aralkyl, heteroalkyl, heterocycloalkyl, heteroaralkyl, aryl, etc.

In one embodiment, linear alkyl and branched alkyl (for the $R^9$ groups in the formula (1) or $R^1$ for other formulas described herein, e.g., formulas for polymer (A)) are chosen from straight-chain or branched $C_1$-$C_{10}$ alkyl groups, in another embodiment, $C_1$-$C_6$ alkyl groups, and in still another embodiment, $C_1$-$C_4$ alkyl groups. Examples of suitable linear or branched alkyl groups include, but are not limited to, methyl, ethyl, n-propyl, isopropyl, n-butyl, 2-butyl, tert-butyl, n-pentyl, 2-pentyl, 3-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 3-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 4-heptyl, 2-ethylpentyl, 1-propylbutyl, n-octyl, 2-octyl, 3-octyl, 4-octyl, 2-methylheptyl, 3-methylheptyl, 4-methylheptyl, 5-methylheptyl, 6-methylheptyl, 1,1-dimethylhexyl, 1,2-dimethylhexyl, 1,3-dimethylhexyl, 1,4-dimethylhexyl, 1,5-dimethylhexyl, 2-ethylhexyl.

In one embodiment, cycloalkyl (for the $R^9$ groups in the formula (1) or $R^1$ for other formulas described herein, e.g., formulas for polymer (A)) is chosen from a $C_3$-$C_{12}$ cycloalkyl group such as cyclopropyl, cyclopentyl, cyclohexyl or cycloheptyl. If the cycloalkyl group is substituted, it may have 1, 2, 3, 4 or 5, substituents selected from among alkyl, alkoxy, halogen, etc. The cycloalkyl can include polycyclic ring systems, including spirocyclic compounds, fused cyclic compounds, and bridged cyclic compounds. The cycloalkyl can include bicyclic ring systems and bicyclic ring systems substituted by an oxo group. Spirocyclic compounds include, but are not limited to, spiro[2.2]pentyl and spiro[2.5]octanyl. Fused cyclic compounds include, but are not limited to, bicyclo[1.1.0]butyl and gonanyl. Bridged cyclic compounds include, but are not limited to, bicyclo [2.2.1]heptyl, dicyclopentadienyl, and 2,6,6-trimethylbicyclo[3.1.1]heptyl. Suitable bicyclic ring systems substituted by an oxo group include, but are not limited to, (7,7-dimethyl-2-oxobicyclo[2.2.1]heptan-1-yl)methyl.

Suitable heteroaryl groups (for the $R^9$ groups in the formula (1) or $R^1$ for other formulas described herein, e.g., formulas for polymer (A)) include, but are not limited to, furanyl, thiophenyl, pyrrolyl, pyrazolyl, imidazolyl, indolyl, carbazolyl, pyridyl, quinolinyl, acridinyl, pyridazinyl, pyrimidinyl, or pyrazinyl. Substituted heteroaryl radicals may have 1, 2, or 3 substituents selected from among alkyl, alkoxy, aryl, perhaloalkyl, such as trifluoromethyl, and halogen.

In one embodiment, the present invention provides a composition where the polymer component (A) comprises a reactive silyl group but is free of siloxane bonds, and the catalyst component (C) comprises a bismuth(III) sulfonate of the formula (1):

$$Bi(O_3SR^9)_r(Q)_{3-r} \qquad (1)$$

where $R^9$ is chosen from a linear alkyl, a branched alkyl, a cycloalkyl, a heteroaryl, an aralkyl, a branched aralkyl, a heteroalkyl, a heterocycloalkyl, a heteroaralkyl, an aryl, or a combination of two or more thereof.

Aralkyl and branched aralkyl groups (for the $R^9$ groups in the formula (1) or $R^1$ for other formulas described herein, e.g., formulas for polymer (A)) include, but are not limited to, groups comprising an alkyl portion having from 1 to 16 carbons inclusively, in one embodiment from 1 to 8 carbons, and in another embodiment, from 1 to 4 carbons. The alkyl portion of an aralkyl group can include one or more positions of unsaturation such as a double bond or a triple bond in the chain when the chain includes two or more carbon atoms. The aryl portion of an aralkyl group can be a monocyclic or polycyclic moiety from 3 to 13 carbons inclusively per ring in the aryl portion, in one embodiment from 4 to 6 carbons inclusively per ring, and in another embodiment 5 to 6 carbons inclusively per ring.

For heteroalkyl, heterocycloalkyl, heteroaryl, and heteroaralkyl groups, the groups comprise at least one heteroatom, or heteratom-containing group. The heteroatom may be chosen from, but is not limited to members of Groups 13, 14, 15, 16, and 17, or a combination of two or more thereof. The heteroatom or heteroatom-containing group may be pendant to the main chain or ring system, part of the main chain, or both.

Suitable aryl groups (for the $R^9$ groups in the formula (1) or $R^1$ for other formulas described herein, e.g., formulas for polymer (A)) include, but are not limited to, phenyl, tolyl, xylyl, mesityl, naphthyl, anthracenyl, phenanthrenyl or naphthacenyl. Substituted aryl radicals preferably have 1, 2, 3, 4 or 5, in particular 1, 2 or 3, substituents selected from among alkyl, alkoxy, carboxyl, carboxylate, sulfonylaryl, sulfonylalkyl, cyano, carboxy, carbonyl, haloalkyl, sulfonate, nitro, halogen, combinations of two or more thereof, etc.

In one embodiment, Q is a ligand that bonds to the Bismuth atom via an atom that is selected from Groups 14, 15, 16, or 17. In another embodiment, Q is selected from the group of anionic ligands containing OH; $C_1$-$C_{10}$ alkoxy; halides; pseudohalogenides, such as cyanide; amides such as dialkylamides, diarylamides, and bis(silyl)amides; mercaptides such as alkylmercaptides, arylmercaptides, and silylmercaptides; $C_1$-$C_{12}$ alkyl, $C_6$-$C_{18}$ aryl, or $C_7$-$C_{30}$ aralkyl. In another embodiment, Q is comprised of a divalent unit such as —O—, —$NR^3$—, —S—, or —$(CH_2)_g$— that links together two or more bismuth atoms to give a polymetallic complex or bismuth cluster.

Examples of bismuth(III) compounds suitable as the catalyst include, but are not limited to, bismuth(III) methanesulfonate, bismuth(III) (+)-camphor-10-sulfonate, bismuth(III) p-xylene-2-sulfonate, combinations of two or more thereof, etc.

In one embodiment, the catalyst composition or system is substantially free of tin and fluorine. In one embodiment, the catalyst system has less than 10 wt. % of fluorine; less than 7.5 wt. % of fluorine; less than 5 wt. % of fluorine; less than 1 wt. % of fluorine; less than 0.1 wt. % of fluorine; even less than 0.01 wt. % of fluorine.

The catalyst system can include other compounds known to accelerate or catalyze the condensation reaction such as complexes or salts of metals including but not limited to titanium, zirconium, zinc, aluminum, iron, and bismuth; carboxylic acids including but not limited to acetic acid, lauric acid, stearic acid, and versatic acid; alkyl- and arylsulfonic acids including but not limited to p-toluenesulfonic acid and methanesulfonic acid; inorganic acids including but not limited to hydrochloric acid, phosphoric acid, and boric acid; amines including but not limited to trioctylamine; guanidines including but not limited to tetramethylguanidine; amidines including but not limited to 1,8-diazabicyclo[5.4.0]-7-undecene (DBU) and 1,5-diazabicyclo[4.3.0]non-5-ene (DBN); and inorganic bases including but not limited to lithium hydroxide and sodium methoxide; such that the system is substantially free of fluorine and tin.

In one embodiment, the condensation catalyst (C) may be added to the curable composition in an amount of from about 0.001 to about 7.0 pt. wt. related to 100 part per weight of component (A). In another embodiment the bismuth(III) complex may be added in an amount of from about 0.1 to about 5.0 pt. wt. In still another embodiment, the bismuth (III) complex may be added in an amount of from about 0.15 to about 2.5 pt. wt. In still another embodiment, bismuth(III) complex may be present in an amount of about 0.2 to about 0.5 pt. wt. per 100 pt. wt. of component (A) 0.005 to about 7.0 pt. wt.; 0.01 to about 7.0 pt.wt.; about 0.05 to about 5 pt. wt.; from about 0.1 to 2.5 pt. wt.; from about 0.5 to about 2 pt. wt.; even from about 1 to about 1.5 pt. wt. per 100 parts per weight of the polymer (A). In another embodiment, the bismuth(III) complex is present in an amount of from about 0.005 to about 0.05 pt. wt. per 100 pt. wt. of component (A). An increase in the amount of bismuth(III) complex as a catalyst may increase the cure rate of curing the surface and decrease the cure time for a tack-free surface and the complete cure through the bulk.

The composition further includes an adhesion promoter component (D) that is different from component (A) or (B).

In one embodiment, the adhesion promoter (D) may be an organofunctional silane comprising the group $R^5$, e.g., aminosilanes, and other silanes that are not identical to the silanes of component (B), or are present in an amount that exceeds the amount of silanes necessary for endcapping the polymer (A). The amount of non-reacted silane (B) or (D) in the reaction for making (A) can be defined in that after the endcapping reaction the free silanes are evaporated at a higher temperature up to 200° C. and vacuum up to 1 mbar to be more than 0.1 wt. % of (A).

Thus, some selected amines can advantageously be added to fine tune the rate of the metal-complex-catalyzed condensation curing of silicone/non-silicone polymer containing reactive silyl groups, as desired.

In one embodiment, the composition comprises an adhesion promoter (D) comprising a group $R^5$ as described by the general formula (7):

   (7)

where $R^5$ is E-$(CR^3{}_2)_h$—W—$(CH_2)_h$—; $R^1$, $R^2$, and d are as described above; g is 1 or 2; d+g=1 to 2; and h is 0 to 8, and may be identical or different.

Non-limiting examples of suitable compounds include:

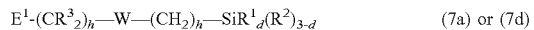   (7a) or (7d)

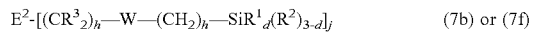   (7b) or (7f)

where j is 2 to 3.

The group E may be selected from either a group $E^1$ or $E^2$. $E^1$ may be selected from a monovalent group comprising amine, —$NH_2$, —NHR, —$(NHC_2H_5)_a$NHR, $NHC_6H_5$, halogen, pseudohalogen, unsaturated aliphatic group with up to 14 carbon atoms, epoxy-group-containing aliphatic group with up to 14 carbon atoms, cyanurate-containing group, and an isocyanurate-containing group.

$E^2$ may be selected from a group comprising a di- or multivalent group consisting of amine, polyamine, cyanurate-containing, and an isocyanurate-containing group, sulfide, sulfate, phosphate, phosphite, and a polyorganosiloxane group, which can contain $R^5$ and $R^2$ groups; W is selected from the group consisting of a single bond, a heteroatomic group selected from —COO—, —O—, epoxy, —S—, —CONH—, —HN—CO—NH— units; $R^3$ is as defined above, $R^1$ may be identical or different as defined above, $R^2$ is defined as above and may be identical or different.

Non-limiting examples of component (D) include:

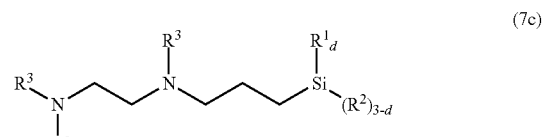   (7c)

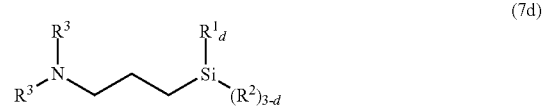   (7d)

   (7e)

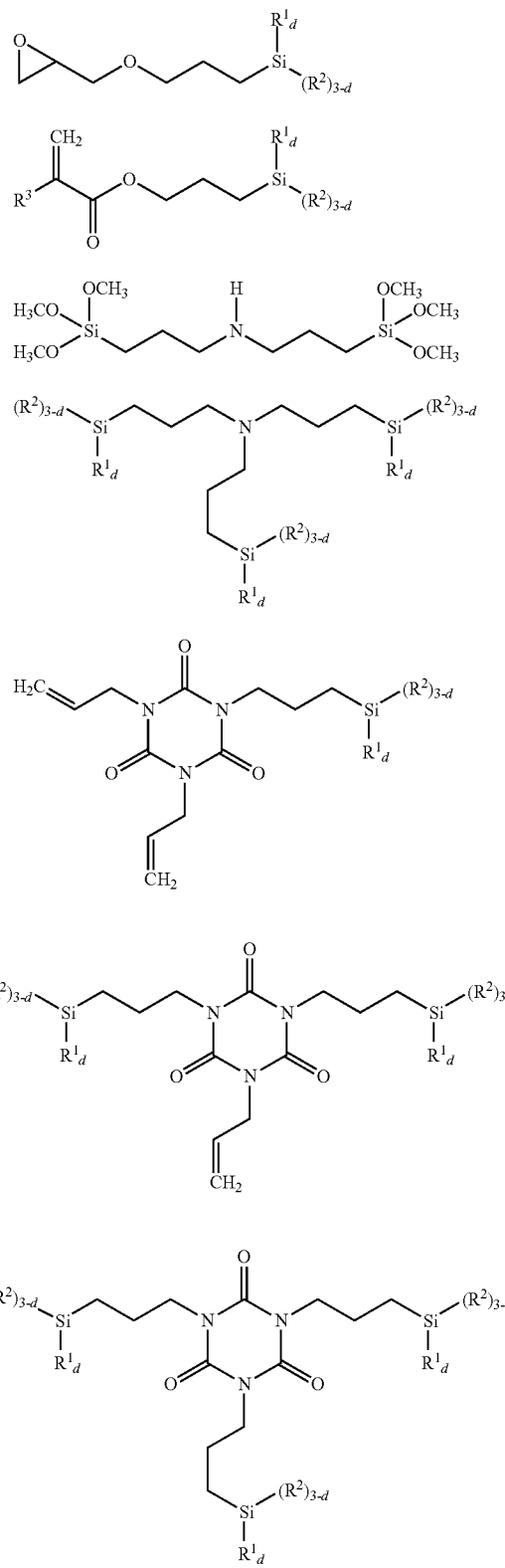

wherein: R, $R^2$, $R^5$, and d are as defined above; k is 0 to 6 (and in one embodiment desirably 0); b is as described above (in one embodiment desirably 0 to 5); and 1+b≤10. In one embodiment, $R^5$ is selected from:

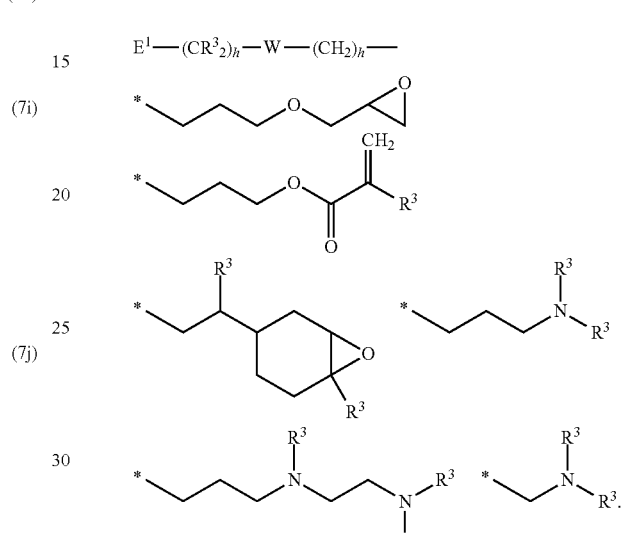

An exemplary group of adhesion promoters are selected from the group that consists of amino-group-containing silane coupling agents. The amino-group-containing silane adhesion promoter agent (D) is an acidic compound having a group containing a silicon atom bonded to a hydrolyzable group (hereinafter referred to as a hydrolyzable group attached to the silicon atom) and an amino group. Specific examples thereof include the same silyl groups with hydrolyzable groups described above. Among these groups, the methoxy group and ethoxy group are particularly suitable. The number of the hydrolyzable groups may be 2 or more, and particularly suitable are compounds having 3 or more hydrolyzable groups.

Examples of other suitable adhesion promoter (D) include, but are not limited to N-(2-aminoethyl)aminopropyltrimethoxysilane, gamma-aminopropyltriethoxysilane, gamma-aminopropyltrimethoxysilane, bis(3-trimethoxysilylpropyl)amine, N-phenyl-gamma-aminopropyltrimethoxysilane, triaminofunctionaltrimethoxysilane, gamma-aminopropylmethyldimethoxysilane, gamma-aminopropylmethyldiethoxysilane, methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, gamma-glycidoxypropylmethyldimethoxysilane, gamma-glycidoxypropylmethyldiethoxysilane, beta-(3,4-epoxycyclohexyl)ethyltrimethoxysilane, beta-(3,4-epoxycyclohexyl)ethylmethyldimethoxysilane, beta-(3,4-epoxycyclohexyl)ethyltriethoxysilane, beta-(3,4-epoxycyclohexyl)ethylmethyldiethoxysilane, epoxylimonyltrimethoxysilane, is ocyanatopropyltriethoxwherein $R^1$, $R^2$, and d are as defined above. Examples of component (D) include compounds of the formulas (7a-7l). Furthermore the formula (7b) of compounds (D) shall comprise compounds of the formula (7m):

ysilane, isocyanatopropyltrimethoxysilane, is ocyanatopropylmethyldimethoxysilane, beta-cyanoethyltrimethoxysilane, gamma-acryloxypropyltrimethoxysilane, gamma-methacryloxypropylmethyldimethoxysilane, alpha, omega-bis(aminoalkyldiethoxysilyl)polydimethylsiloxanes (Pn=1-7), alpha, omega-bis(aminoalkyldiethoxysilyl) octamethyltetrasiloxane, 4-amino-3,3-dimethylbutyltrimethoxysilane, and N-ethyl-3-trimethoxysilyl-2-methylpropanamine, 3-(N,N-diethylaminopropyl)trimethoxysilane combinations of two or more thereof, and the like. Particularly suitable adhesion promoters include bis(alkyltrialkoxysilyl)amines and tris (alkyltrialkoxysilyl)amines including, but not limited to, bis(3-trimethoxysilylpropyl)amine and tris(3-trimethoxysilylpropyl)amine.

Also it is possible to use derivatives obtained by modifying them, for example, amino-modified silyl polymer, silylated amino polymer, unsaturated aminosilane complex, phenylamino long-chain alkyl silane and aminosilylated silicone. These amino-group-containing silane coupling agents may be used alone, or two or more kinds of them may be used in combination.

The adhesion promoter (D) may be present in an amount of from about 0.1 to about 5.0 pt. wt. based on 100 parts of the polymer component (A). In one embodiment, the adhesion promoter may be present in an amount of from about 0.15 to about 2.0 pt. wt. based on 100 parts of the polymer component (A). In another embodiment, the adhesion promoter may be present in an amount of from about 0.5 to about 1.5 pt. wt of the polymer component (A). This defines the amount of (D) in composition of (A) wherein the content of free silanes coming from the endcapping of polymer (A) is smaller than 0.1 wt. %.

The present compositions may further include a filler component (E). The filler component(s) (E) may have different functions, such as to be used as reinforcing or semi-reinforcing filler, i.e., to achieve higher tensile strength after curing. The filler component may also have the ability to increase viscosity, establish pseudoplasticity/shear thinning, and demonstrate thixotropic behavior. Non-reinforcing fillers may act as volume extenders. The reinforcing fillers are characterized by having a specific surface area of more than 50 m$^2$/g related BET-surface, whereby the semi-reinforcing fillers have a specific surface area in the range of 10-50 m$^2$/g. So-called extending fillers have preferably a specific surface area of less than 10 m$^2$/g according to the BET-method and an average particle diameter below 100 p.m. In one embodiment, the semi-reinforcing filler is a calcium carbonate filler, a silica filler, or a mixture thereof. Examples of suitable reinforcing fillers include, but are not limited to, fumed silicas or precipitated silicas, which can be partially or completely treated with organosilanes or siloxanes to make them less hydrophilic and decrease the water content or control the viscosity and storage stability of the composition. These fillers are named hydrophobic fillers. Tradenames are Aerosil®, HDK®, Cab-O-Sil® etc.

Examples of suitable extending fillers include, but are not limited to, ground silicas (Celite™), precipitated and colloidal calcium carbonates (which are optionally treated with compounds such as stearate or stearic acid); reinforcing silicas such as fumed silicas, precipitated silicas, silica gels and hydrophobized silicas and silica gels; crushed and ground quartz, cristobalite, alumina, aluminum hydroxide, titanium dioxide, zinc oxide, diatomaceous earth, iron oxide, carbon black, powdered thermoplastics such as acrylonitrile, polyethylene, polypropylene, polytetrafluoroethylene and graphite or clays such as kaolin, bentonite or montmorillonite (treated/untreated), and the like.

The type and amount of filler added depends upon the desired physical properties for the cured silicone/non-silicone composition. As such, the filler may be a single species or a mixture of two or more species. The extending fillers can be present from about 0 to about 300 wt. % of the composition related to 100 parts of component (A). The reinforcing fillers can be present from about 5 to about 60 wt. % of the composition related to 100 parts of component (A), preferably 5 to 30 wt. %.

The inventive compositions optionally comprise an acidic compound (F), which, in conjunction with the adhesion promoter and bismuth(III) sulfonate, catalyst, may accelerate curing (as compared to curing in the absence of such compounds). The component (F) may be present in an amount of from about 0.01 to about 5 wt. % of the composition. In another embodiment 0.01 to about 8 parts per weight (pt. wt.) per 100 pt. wt. of component (A) are used, more preferably 0.02 to 3 pt. wt. per 100 pt. wt. of component (A) and most preferably 0.02 to 1 pt. wt. per 100 pt. wt. of component (A) are used.

The acidic compounds (F) may be chosen from various phosphate esters, phosphonates, phosphites, phosphonites, sulfites, sulfates, pseudohalogenides, branched alkyl carboxylic acids, combinations of two or more thereof, and the like. Without being bound to any particular theory, the acidic compounds (F) may, in one embodiment, be useful as stabilizers in order to ensure a longer storage time when sealed in a cartridge before use in contact with ambient air. Especially alkoxy-terminated polysiloxanes can lose the ability to cure after storage in a cartridge and show decreased hardness under curing conditions. It may, therefore be useful to add compounds of the formula (8), which can extend storage time or ability to cure over months.

$$O=P(OR^6)_{3-c}(OH)_c \qquad (8)$$

whereby c is as defined above; and R$^6$ is selected from the group of linear or branched and optionally substituted C$_1$-C$_{30}$ alkyl groups, linear or branched C$_5$-C$_{14}$ cycloalkyl groups, C$_6$-C$_{14}$ aryl groups, C$_6$-C$_{31}$ alkylaryl groups, linear or branched C$_2$-C$_{30}$ alkenyl groups or linear or branched C$_1$-C$_{30}$ alkoxyalkyl groups, C$_4$-C$_{300}$ polyalkenylene oxide groups (polyethers), such as Marlophor® N5 acid, triorganylsilyl- and diorganyl (C$_1$-C$_8$)-alkoxysilyl groups. The phosphates can include also mixtures of primary and secondary esters. Non-limiting examples of suitable phosphonates include 1-hydroxyethane-(1,1-diphosphonic acid) (HEDP), aminotris(methylene phosphonic acid) (ATMP), diethylenetriaminepenta(methylene phosphonic acid) (DTPMP), 1,2-diaminoethane-tetra(methylene phosphonic acid) (EDTMP), and phosphonobutanetricarboxylic acid (PBTC).

In another embodiment, a compound of the formula O=P(OR$^7$)$_{3-g}$(OH)$_g$ may be added where g is 1 or 2, and R$^7$ is defined as R$^6$ or di- or mulitvalent hydrocarbons with one or more amino group.

Another type are phosphonic acid compounds of the formula R$^6$P(O)(OH)$_2$ such as alkyl phosphonic acids preferably hexyl or octyl phosphonic acid.

In one embodiment, the acidic compound may be chosen from a mono ester of phosphoric acid of the formula (R$^8$O)PO(OH)$_2$; a phosphonic acid of the formula R$^8$P(O) (OH)$_2$; or a monoester of phosphorous acid of the formula (R$^8$O)P(OH)$_2$ where R$^8$ is a C$_1$-C$_{18}$ alkyl, a C$_2$-C$_{20}$ alkoxyalkyl, phenyl, a C$_7$-C$_{12}$ alkylaryl, a C$_2$-C$_4$ polyalkylene oxide ester or its mixtures with diesters, etc.

In another embodiment, the acidic compound is a branched $C_4$-$C_{30}$ alkyl carboxylic acids, including $C_5$-$C_{19}$ acids with an alpha tertiary carbon, or a combination of two or more thereof. Examples of such suitable compounds include, but are not limited to, Versatic™ Acid, lauric acid, and stearic acid. In one embodiment, the acidic compound may be a mixture comprising branched alkyl carboxylic acids. In one embodiment, the acidic compound is a mixture of mainly tertiary aliphatic $C_{10}$ carboxylic acids.

Generally, the acidic component (F) is added in a molar ratio of less than or equal to 1 with respect to catalyst (C). In embodiments, the acidic component (F) is added in a molar ratio of (F):(C) of 1:15 to 1:1.

The curable composition may also include auxiliary substances (G) such as plasticizers, pigments, stabilizers, anti-microbial agents, fungicides, biocides, and/or solvents. Preferred plasticizers for reactive polyorganosiloxanes (A) are selected from the group of polyorganosiloxanes having chain lengths of 10 to 300 siloxy units. Preferred are trimethylsilyl terminated polydimethylsiloxanes having a viscosity of 100 to 1000 mPa·s at 25° C. The choice of optional solvents (dispersion media or extenders) may have a role in assuring uniform dispersion of the catalyst, thereby altering curing speed. Such solvents include polar and non-polar solvents such as toluene, hexane, chloroform, methanol, ethanol, isopropyl alcohol, acetone, methylethyl ketone, dimethylformamide (DMF), dimethyl sulfoxide (DMSO), N-methylpyrrolidinone (NMP), and propylene carbonate. Water can be an additional component (G) to accelerate fast curing 2-part compositions RTV-2, whereby the water can be in one part of the 2 compositions. Particularly suitable non-polar solvents include, but are not limited to, toluene, hexane, and the like if the solvents should evaporate after cure and application. In another embodiment, the solvents include high-boiling hydrocarbons such as alkylbenzenes, phtalic acid esters, arylsulfonic acid esters, trialkyl- or triarylphosphate esters, which have a low vapor pressure and can extend the volume providing lower costs. Examples cited by reference may be those of U.S. Pat. No. 6,599,633; U.S. Pat. No. 4,312,801. The solvent can be present in an amount of from about 20 to about 99 wt. % of the catalyst composition.

Applicants have found that the sulfonyl-containing bismuth(III) catalyst may provide a curable composition that yields a cured polymer exhibiting a tack-free time, hardness, and/or cure time comparable to compositions made using tin catalysts, but that provide better adhesion compared to materials made using tin catalysts.

In one embodiment, a composition in accordance with the present invention comprises: 100 pt. wt. polymer component (A); about 0.1 to about 10 pt. wt. crosslinker component (B); and about 0.01 to about 7 pt. wt. catalyst component (C). In one embodiment, the composition further comprises from about 0.1 to about 5, in one embodiment 0.15 to 1 pt. wt., of an adhesion promoter component (D); about 0 to about 300 pt. wt. filler component (E); about 0.01 to about 7 pt. wt. of acidic compound (F); optionally 0 to about 15 pt. wt. component (G), where the pt. wt. of components (B) (G) are each based on 100 parts of the polymer component (A). In one embodiment, the composition comprises the component (F) in an amount of from about 0.01 to about 1 pt. wt. per 100 pt. wt. of component (A). In still another embodiment, the composition comprises the catalyst (C) in an amount of from about 0.1 to about 0.8 wt. pt. per 100 wt. pt of component (A).

It will be appreciated that the curable compositions may be provided as either a one-part composition or a two-part composition. A one-part composition refers to a composition comprising a mixture of the various components described above. A two-part composition may comprise a first portion and a second portion that are separately stored and subsequently mixed together just prior to application for curing. In one embodiment, a two-part composition comprises a first portion (P1) comprising a polymer component (A) and a crosslinker component (B), and a second portion (P2) comprising the catalyst component (C) comprising the bismuth (III) complex. The first and second portions may include other components (F) and/or (G) as may be desired for a particular purpose or intended use. For example, in one embodiment, the first portion (P1) may optionally comprise an adhesion promoter (D) and/or a filler (E), and the second portion (P2) may optionally comprise auxiliary substances (G), a cure rate modifying component (F), and water (G).

In one embodiment, a two-part composition comprises (i) a first portion comprising the polymer component (A), optionally the filler component (E), and optionally the acidic compound (F); and (ii) a second portion comprising the crosslinker (B), the catalyst component (C), the adhesive promoter (D), and the acidic compound (F), where portions (i) and (ii) are stored separately until applied for curing by mixing of the components (i) and (ii).

An exemplary two-part composition comprises: a first portion (i) comprising 100 pt. wt. of component (A), and 0 to 70 pt. wt. of component (E); and a second portion (ii) comprising 0.1 to 5 pt. wt. of at least one crosslinker (B); 0.01 to 4 pt. wt. of a catalyst (C); 0.1 to 2 pt. wt. of an adhesion promoter (D); and 0.02 to 1 pt. wt. component (F).

The curable compositions may be used in a wide range of applications including as materials for sealing, mold making, glazing, prototyping; as adhesives; as coatings in sanitary rooms; as joint seal between different materials, e.g., sealants between ceramic or mineral surfaces and thermoplastics; as paper release; as impregnation materials; and the like. A curable composition in accordance with the present invention comprising a bismuth(III) complex as a catalyst may be suitable for a wide variety of applications such as, for example, a general purpose and industrial sealant, potting compound, caulk, adhesive or coating for construction use, insulated glass, structural glazing, where glass sheets are fixed and sealed in metal frame; caulks, adhesives for metal plates, car bodies, vehicles, electronic devices, and the like. Furthermore, the present composition may be used either as a one-part RTV-1 or as a two-part RTV-2 formulation that can adhere onto broad variety of metal, mineral, ceramic, rubber, or plastic surfaces.

Curable compositions comprising bismuth(III) catalysts compounds may be further understood with reference to the following Examples.

EXAMPLES

Silanol-terminated silicone fluid (viscosity 30,000 cps), dibutyltin dilaurate, and acetoxy-based crosslinker were obtained from Momentive Performance Materials. Bismuth trifluoromethanesulfonate was purchased from the Aldrich Chemical Company and used as received. N-Methylpyrrolidinone was purchased from Fisher Scientific Corporation and used as received.

Bismuth sulfonate complexes were synthesized using synthetic methods such as those described for bismuth trifluoromethanesulfonate presented in *Tetrahedron Letters*, 43, (2002) 993-995 and in *Tetrahedron Letters*, 40, (1999) 285-286. The former describes the neutralization of bismuth oxide by trifluoromethanesulfonic acid and the latter describes the protonolysis of triphenylbismuth by trifluoromethanesulfonic acid.

The following examples demonstrate the use of these bismuth compounds as condensation cure catalysts in silicone compositions.

EXAMPLES 1-6

Tack-Free Time and Deep Section Cure Time Tests

Example 1

A glass vial containing a magnetic stir bar is charged with 29.7 mg of bismuth camphorsulfonate and 6.61 g of acetoxy-based crosslinker solution. This mixture is stirred under ambient conditions until the solid completely dissolves. The resulting catalyst/crosslinker solution is clear and pale gold in appearance.

A plastic mixing cup is charged with 114.91 g of silanol-terminated silicone fluid (viscosity of about 30,000 cps) and 5.30 g of catalyst/crosslinker solution. The formulation is then mixed in a Hauschild mixer to give a homogeneous silicone formulation.

Example 2

A glass vial containing a magnetic stir bar is charged with 60 mg of bismuth camphorsulfonate and 6.60 g of acetoxy-based crosslinker solution. This mixture is stirred under ambient conditions until the solid completely dissolves. The resulting catalyst/crosslinker solution is clear and pale gold in appearance.

A plastic mixing cup is charged with 114.65 g of silanol-terminated silicone fluid (viscosity of about 30,000 cps) and 5.24 g of catalyst/crosslinker solution. The formulation is then mixed in a Hauschild mixer to give a homogeneous silicone formulation.

Example 3

A glass vial containing a magnetic stir bar is charged with 117.2 mg of bismuth camphorsulfonate and 6.60 g of acetoxy-based crosslinker solution. This mixture is stirred under ambient conditions until the solid completely dissolves. The resulting catalyst/crosslinker solution is clear and pale gold in appearance.

A plastic mixing cup is charged with 114.6 g of silanol-terminated silicone fluid (viscosity of about 30,000 cps) and 5.3 g of catalyst/crosslinker solution. The formulation is then mixed in a Hauschild mixer to give a homogeneous silicone formulation.

Example 4

A glass vial containing a magnetic stir bar is charged with 15.5 mg of bismuth methanesulfonate and 6.94 g of acetoxy-based crosslinker solution. This mixture is stirred under ambient conditions until the solid completely dissolves. The resulting catalyst/crosslinker solution is clear and pale gold in appearance.

A plastic mixing cup is charged with 114.54 g of silanol-terminated silicone fluid (viscosity of about 30,000 cps) and 5.3 g of catalyst/crosslinker solution. The formulation is then mixed in a Hauschild mixer to give a homogeneous silicone formulation.

Example 5

A glass vial containing a magnetic stir bar is charged with 29 mg of bismuth methanesulfonate and 6.62 g of acetoxy-based crosslinker solution. This mixture is stirred under ambient conditions until the solid completely dissolves. The resulting catalyst/crosslinker solution is clear and pale gold in appearance.

A plastic mixing cup is charged with 114.84 g of silanol-terminated silicone fluid (viscosity of about 30,000 cps) and 5.31 g of catalyst/crosslinker solution. The formulation is then mixed in a Hauschild mixer to give a homogeneous silicone formulation.

Example 6

A glass vial containing a magnetic stir bar is charged with 100 mg of bismuth methanesulfonate and 6.62 g of acetoxy-based crosslinker solution. This mixture is stirred under ambient conditions overnight to completely dissolve the solid. After this time, the vial contains a significant amount of gel and the mixture can not be tested.

COMPARATIVE EXAMPLES 1-5

Tack-Free Time and Deep Section Cure Time Tests

Comparative Example 1

A glass vial containing a magnetic stir bar is charged with 78 mg of bismuth trifluoromethanesulfonate and 6.58 g of acetoxy-based crosslinker solution. This mixture is stirred under ambient conditions until all solid particles are dissolves. The resulting catalyst/crosslinker solution is clear and light orange-red in appearance.

A plastic mixing cup is charged with 114.58 g of silanol-terminated silicone fluid (viscosity of about 30,000 cps) and 5.30 g of catalyst/crosslinker solution. The formulation is then mixed in a Hauschild mixer to give a homogeneous silicone formulation.

Comparative Example 2

A glass vial containing a magnetic stir bar is charged with 40 mg of bismuth trifluoromethanesulfonate and 6.24 g of acetoxy-based crosslinker solution. This mixture is stirred under ambient conditions until the solid completely dissolves. The resulting catalyst/crosslinker solution is clear and light orange in appearance.

A plastic mixing cup is charged with 114.65 g of silanol-terminated silicone fluid (viscosity of about 30,000 cps) and 5.32 g of catalyst/crosslinker solution. The formulation is then mixed in a Hauschild mixer to give a homogeneous silicone formulation.

Comparative Example 3

A glass vial containing a magnetic stir bar is charged with 21 mg of bismuth trifluoromethanesulfonate and 6.60 g of acetoxy-based crosslinker solution. This mixture is stirred under ambient conditions until the solid completely dissolves. The resulting catalyst/crosslinker solution is clear and light pink in appearance.

A plastic mixing cup is charged with 125.79 g of silanol-terminated silicone fluid (viscosity of about 30,000 cps) and 5.72 g of catalyst/crosslinker solution. The formulation is then mixed in a Hauschild mixer to give a homogeneous silicone formulation.

Comparative Example 4

A plastic mixing cup is charged with 114.90 g of silanol-terminated silicone fluid (viscosity of about 30,000 cps) and 5.29 g of DBTDL-containing, acetoxy-based crosslinker solution. The formulation is then mixed in a Hauschild mixer to give a homogeneous silicone formulation.

Comparative Example 5

A plastic mixing cup is charged with 114.5 g of silanol-terminated silicone fluid (viscosity of about 30,000 cps) and 5.3 g of acetoxy-based crosslinker solution. The formulation is then mixed in a Hauschild mixer to give a homogeneous silicone formulation.

Figure 2:
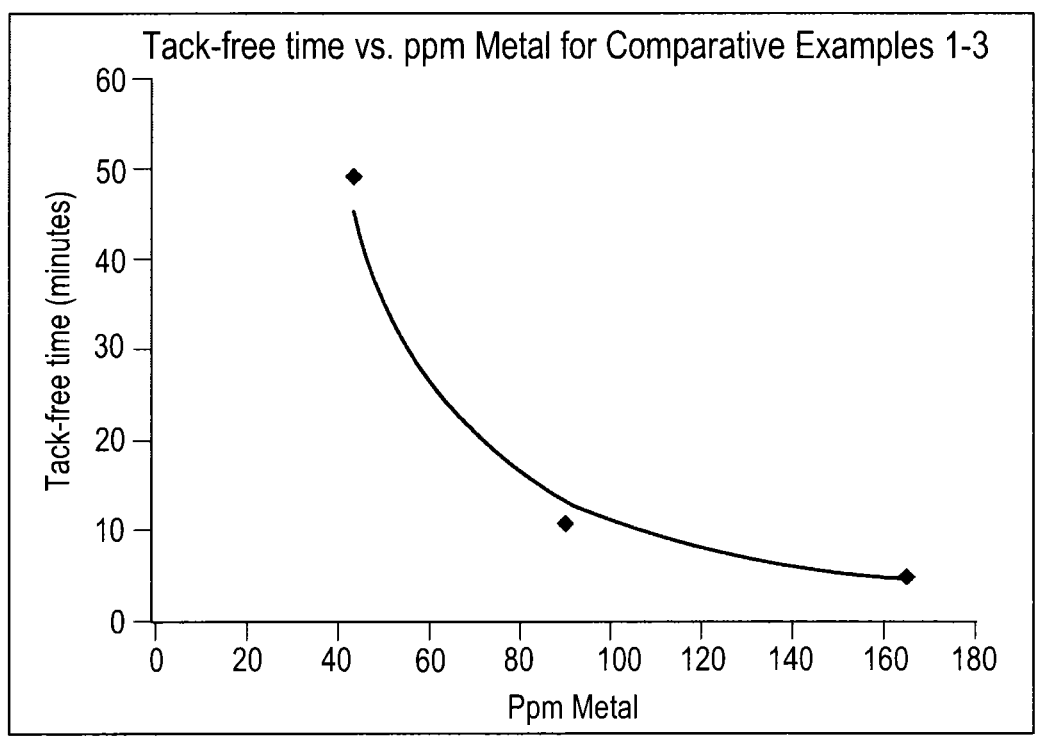
FIG. 2 is a graph showing tack-free time versus metal concentration for Comparative Examples 1 to 3.
Figure 3:
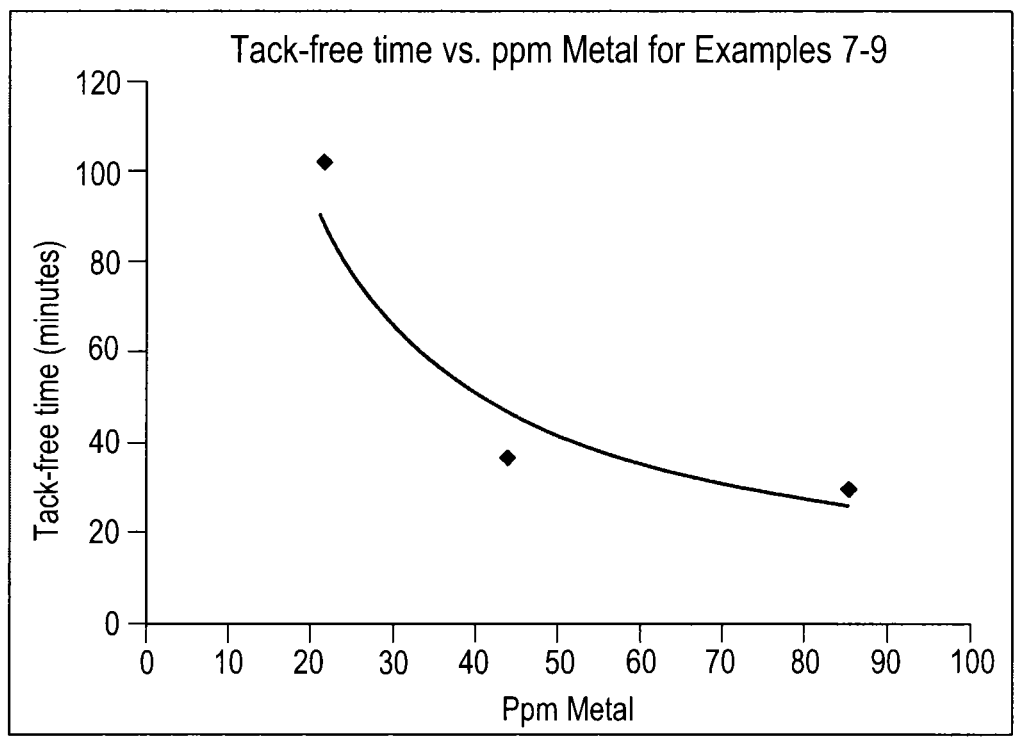
FIG. 3 is a graph showing tack-free time versus metal concentration for catalyst composition in accordance with aspects of the present technology.
Figure 4:
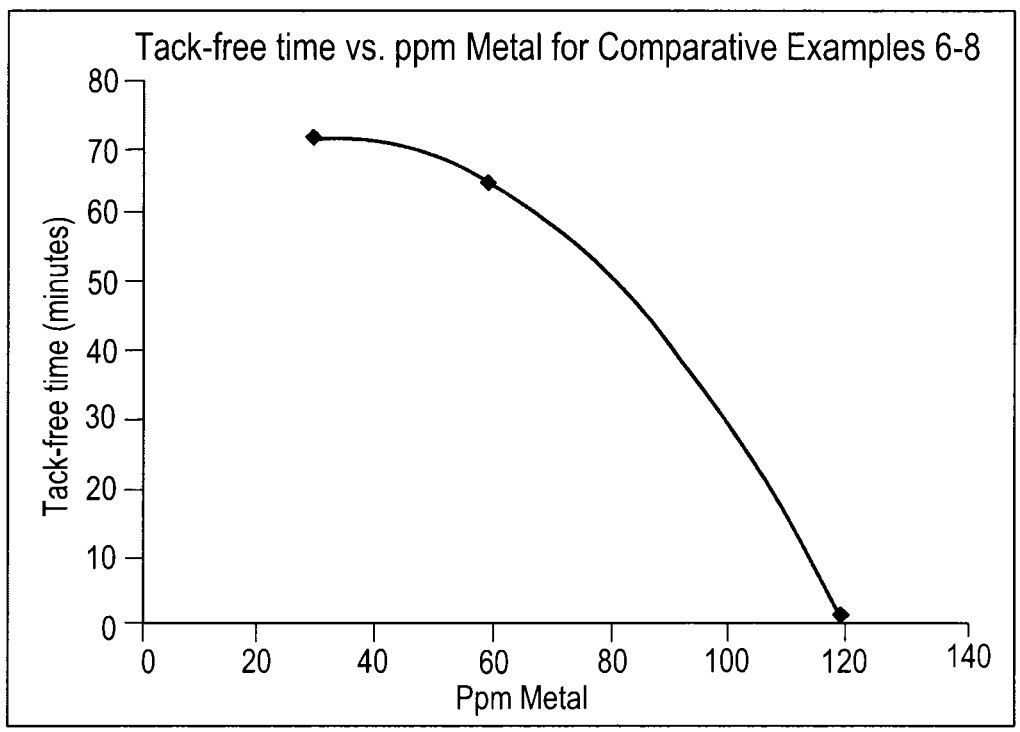
FIG. 4 is a graph showing tack-free time versus metal concentration for Comparative Examples 6 to 8.

Tack-free time measurements are performed using a modified version of WPSTM E-63 where samples are placed in 3 plastic Petri dishes 60 mm in diameter and 15 mm in height. Results are given in Table 1 and shown in FIGS. 1 and 2.

TABLE 1

Tack-Free Time Results for Acetoxy-based Silicone Formulations.

| | Catalyst | Loading (ppm Catalyst) | Loading (ppm Bi) | TFT (min) |
|---|---|---|---|---|
| Example 1 | $Bi(OCS)_3$ | 197 | 45.7 | 52 |
| Example 2 | $Bi(OCS)_3$ | 394 | 91 | 35 |
| Example 3 | $Bi(OCS)_3$ | 771 | 178.5 | 9 |
| Example 4 | $Bi(OMs)_3$ | 99 | 42 | 63 |
| Example 5 | $Bi(OMs)_3$ | 193 | 82 | 31 |
| Example 6 | $Bi(OMs)_3$ | N/A | N/A | N/A |
| Comp Ex 1 | $Bi(OTf)_3$ | 138 | 44 | 49 |
| Comp Ex 2 | $Bi(OTf)_3$ | 282 | 90 | 11 |
| Comp Ex 3 | $Bi(OTf)_3$ | 518 | 165 | 5 |
| Comp Ex 4 | DBTDL | 252 | 47 | 32 |
| Comp Ex 5 | None | 0 | 0 | 180 |

Storage Stability and Cure Behavior

The following examples demonstrate the storage stability of the bismuth(III) camphorsulfonate complex of the present invention in an acetoxy-based crosslinker.

Example 7

To a 20-mL scintillation vial is added 14.2 mg of bismuth (III) camphorsulfonate followed by 8.01 grams of acetoxy-based crosslinker. The mixture is allowed to stand under ambient conditions for two weeks. This catalyst/crosslinker solution is clear and colorless prior to use.

A plastic mixing cup is charged with 74.85 grams of silanol-terminated silicone fluid (viscosity of about 30,000 cps) and 4.15 grams of catalyst/crosslinker solution. The formulation is then mixed in a Hauschild mixer to give a homogeneous silicone formulation.

Example 8

To a 20-mL scintillation vial is added 29.3 mg of bismuth (III) camphorsulfonate followed by 8.00 grams of acetoxy-based crosslinker. The mixture is allowed to stand under ambient conditions for two weeks. This catalyst/crosslinker solution is clear and colorless prior to use.

A plastic mixing cup is charged with 77.91 grams of silanol-terminated silicone fluid (viscosity of about 30,000 cps) and 4.30 grams of catalyst/crosslinker solution. The formulation is then mixed in a Hauschild mixer to give a homogeneous silicone formulation.

Example 9

To a 20-mL scintillation vial is added 57.0 mg of bismuth (III) camphorsulfonate followed by 7.99 grams of acetoxy-based crosslinker. The mixture is allowed to stand under ambient conditions for two weeks. This catalyst/crosslinker solution is clear and colorless prior to use.

A plastic mixing cup is charged with 77.05 grams of silanol-terminated silicone fluid (viscosity of about 30,000 cps) and 4.27 grams of catalyst/crosslinker solution. The formulation is then mixed in a Hauschild mixer to give a homogeneous silicone formulation.

Comparative Example 6

To a 20-mL scintillation vial is added 9.7 mg of bismuth triflate followed by 5.38 grams of acetoxy-based crosslinker. The mixture is allowed to stand under ambient conditions for two weeks. This catalyst/crosslinker solution is clear and brown prior to use.

A plastic mixing cup is charged with 81.0 grams of silanol-terminated silicone fluid (viscosity of about 30,000 cps) and 4.48 g of catalyst/crosslinker solution. The formulation is then mixed in a Hauschild mixer to give a homogeneous silicone formulation.

Comparative Example 7

To a 20-mL scintillation vial is added 21.9 mg of bismuth triflate followed by 6.063 grams of acetoxy-based crosslinker. The mixture is allowed to stand under ambient conditions for two weeks. This catalyst/crosslinker solution is clear and brown prior to use.

A plastic mixing cup is charged with 71.95 grams of silanol-terminated silicone fluid (viscosity of about 30,000 cps) and 3.95 grams of catalyst/crosslinker solution. The formulation is then mixed in a Hauschild mixer to give a homogeneous silicone formulation.

Comparative Example 8

To a 20-mL scintillation vial is added 40.6 mg of bismuth triflate followed by 5.62 grams of acetoxy-based crosslinker. The mixture is allowed to stand under ambient conditions for two weeks. This catalyst/crosslinker solution is clear and dark brown prior to use.

A plastic mixing cup is charged with 81.09 grams of silanol-terminated silicone fluid (viscosity of about 30,000 cps) and 4.46 grams of catalyst/crosslinker solution. The formulation is then mixed in a Hauschild mixer to give a homogeneous silicone formulation.

Tack-free time measurements are performed using a modified version of WPSTM E-63 where samples are placed in plastic Petri dishes that are 60 mm in diameter and 15 mm in height. Each solution is tested in triplicate. Samples are then monitored daily for four days to determine bulk cure time. The number of samples that exhibited complete bulk cure are listed in parentheses in Table 2.

TABLE 2

Cure Time Results for Aged Acetoxy-based Silicone Formulations.

| | Catalyst | Loading (ppm Catalyst) | Loading (ppm metal) | TFT (min) | Bulk Cure Time (days) |
|---|---|---|---|---|---|
| Ex. 7 | Bi(OCS)$_3$ | 93 | 21.5 | 102 | 4 (3 of 3) |
| Ex. 8 | Bi(OCS)$_3$ | 191 | 44.2 | 36 | 4 (3 of 3) |
| Ex. 9 | Bi(OCS)$_3$ | 372 | 86.1 | 30 | 4 (2 of 3) |
| Comp. 6 | Bi(OTf)$_3$ | 94 | 29.9 | 71 | 4 (3 of 3) |
| Comp. 7 | Bi(OTf)$_3$ | 187 | 59.6 | 65 | 4 (3 of 3) |
| Comp. 8 | Bi(OTf)$_3$ | 374 | 119.1 | 1 | N/A |

Embodiments of the invention have been described above and modifications and alterations may occur to others upon the reading and understanding of this specification. The claims as follows are intended to include all modifications and alterations insofar as they come within the scope of the claims or the equivalent thereof.

What is claimed is:

1. A composition for forming a cured polymer composition comprising:
    (A) a polymer having at least a reactive silyl group;
    (B) a crosslinker or chain extender chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alklarylaminosiloxane, an alkoxycarbamatosilane, an alkoxycarbamatosiloxane, and combinations of two or more thereof; and
    (C) a condensation catalyst comprising a bismuth(III) sulfonate complex of the formula (1):

$$Bi(O_3SR^9)_r(Q)_{3-r} \quad (1)$$

where $R^9$ is chosen from a linear alkyl, a branched alkyl, a cycloalkyl, a heteroaryl, an aralkyl, a branched aralkyl, a heteroalkyl, a heterocycloalkyl, a heteroaralkyl, an aryl, or a combination of two or more thereof, Q is an anionic ligand, and r is 1 to 3, with the proviso that heteroalkyl is other than a perhaloalkyl.

2. The composition of claim 1, wherein at least one ($O_3SR^9$) group comprises a $R^9$ chosen from methyl or (7,7-dimethyl-2-oxobicyclo[2.2.1]heptan-1-yl)methyl.

3. The composition of claims 1, wherein r is 3.

4. The composition of claim 1, wherein r is 3 and $R^9$ is methyl.

5. The composition of claim 1, wherein r is 3 and $R^9$ is (7,7-dimethyl-2-oxobicyclo[2.2.1]heptan-1-yl)methyl.

6. The composition of claim 1, comprising from about 0.001 to about 7 parts per weight of catalyst component (C) per 100 parts per weight of the polymer (A).

7. The composition of claim 1 comprising from about 0.01 to about 7 parts per weight catalyst (C) per 100 parts per weight of the polymer (A).

8. The composition of claim 1 comprising from about 0.005 to about 0.05 wt. pt. of catalyst component (C) per 100 parts of component.

9. The polymer composition of claim 1, wherein the polymer (A) has the formula (2):

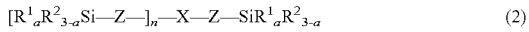

$$[R^1_aR^2_{3-a}Si-Z-]_n-X-Z-SiR^1_aR^2_{3-a} \quad (2)$$

where X is chosen from a polyurethane; a polyester; a polyether; a polycarbonate; a polyolefin; a polyesterether; and a polyorganosiloxane having units of $R_3SiO_{1/2}$, $R_2SiO$, $RSiO_{3/2}$, and/or $SiO_2$;

n is 0 to 100; a is 0 to 2; R and $R^1$ can be identical or different at the same Si-atom and chosen from a $C_1$-$C_{10}$ alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof; $R^2$ is chosen from OH, $C_1$-$C_8$ alkoxy, $C_2$-$C_{18}$ alkoxyalkyl, oximoalkyl, enoxyalkyl, aminoalkyl, carboxyalkyl, amidoalkyl, amidoaryl, carbamatoalkyl, or a combination of two or more thereof; and Z is a bond, a divalent unit selected from the group of a $C_1$-$C_8$ alkylene, or O.

10. The composition of claim 1, wherein the crosslinker component (B) is chosen from tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoximo)silane; vinyltris(methylethylketoximo)silane; 3,3,3-trifluoropropyltris(methylethylketoximo)silane; methyltris(isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis(ethylmethylketoximo)silane; methyldimethoxy(acetaldoxime)silane; methyldimethoxy(N-methylcarbamato)silane; ethyldimethoxy(N-methylcarbamato)silane; methyldimethoxyisopropenoxysilane; trimethoxyisopropenoxysilane; methyltriisopropenoxysilane; methyldimethoxy (but-2-en-2-oxy)silane; methyldimethoxy(1-phenylethenoxy)silane; methyldimethoxy-2-(1-carboethoxypropenoxy)silane; methylmethoxydi(N-methylamino)silane; vinyldimethoxy(methylamino)silane; tetra-N,N-diethylaminosilane; methyldimethoxy(methylamino)silane; methyltri(cyclohexylamino)silane; methyldimethoxy(ethylamino)silane; dimethyldi(N,N-dimethylamino)silane; methyldimethoxy(isopropylamino)silane; dimethyldi(N,N-diethylamino)silane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxy(ethylacetimidato)silane; methyldimethoxy(propylacetimidato)silane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxyisothiocyanatosilane; methylmethoxydiisothiocyanatosilane, the condensates thereof, or a combination of two or more thereof.

11. The composition of claim 1, further comprising an adhesion promoter component (D) is chosen from an (aminoalkyl)trialkoxysilane, an (aminoalkyl)alkyldialkoxysilane, a bis(trialkoxysilylalkyl)amine, a tris(trialkoxysilylalkyl)amine, a tris(trialkoxysilylalkyl)cyanurate, a tris(trialkoxysilylalkyl)isocyanurate, an (epoxyalkyl) alkyldialkoxysilane, an (epoxyalkyl)trialkoxysilane, or a combination of two or more thereof.

12. The polymer composition of claim 1 wherein the polymer component (A) has the formula (4):

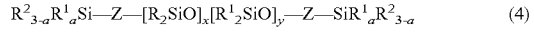

$$R^2_{3-a}R^1_aSi-Z-[R_2SiO]_x[R^1_2SiO]_y-Z-SiR^1_aR^2_{3-a} \quad (4)$$

where x is 0 to 10000; y is 0 to 1000; a is 0 to 2; R is methyl; $R^1$ is chosen from a $C_1$-$C_{10}$ alkyl; a $C_1$-$C_{10}$ alkyl substituted with one or more of Cl, F, N, O, or S; a phenyl; a $C_7$-$C_{16}$ alkylaryl; a $C_7$-$C_{16}$ arylalkyl; a $C_2$-$C_4$ polyalkylene ether; or a combination of two or more thereof, and other siloxane units may be present in amounts less than 10 mol.%; $R^2$ is chosen from OH, a $C_1$-$C_8$ alkoxy, a $C_2$-$C_{18}$ alkoxyalkyl, an oximoalkyl, an oximoaryl, an enoxyalkyl, an enoxyaryl, an aminoalkyl, an aminoaryl, a carboxyalkyl, a carboxyaryl, an amidoalkyl, an amidoaryl, a carbamatoalkyl, a carbamatoaryl, or a combination of two or more thereof; and Z is —O—, a bond, or —$C_2H_4$—.

13. The composition of claim 1, wherein the catalyst system (C) is substantially free of tin and substantially free of fluorine.

14. The composition of claim 13, wherein the catalyst system comprises 10 wt. % or less of fluorine.

15. The composition of claim 13, wherein the catalyst system comprises 5 wt. % or less of fluorine.

16. The composition of claim 13, wherein the catalyst system comprises 1 wt. % or less of fluorine.

17. The composition of claim 13, wherein the catalyst system comprises 0.1 wt. % or less of fluorine.

18. The composition of claim 1, wherein catalyst (C) comprises a blend of metal catalyst complexes.

19. A cured polymer formed from the composition or method of claim 1.

20. The cured polymer of claim 19 in the form of an elastomeric seal, duromeric seal, an adhesive, a coating, an encapsulant, a shaped article, a mold, or an impression material.

21. A composition for forming a cured polymer composition comprising:
(A) a polymer having at least a reactive silyl group, where the polymer is free of siloxane bonds;
(B) a crosslinker or chain extender chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alklarylaminosiloxane, an alkoxycarbamatosilane, an alkoxycarbamatosiloxane, the condensates thereof, and combinations of two or more thereof; and
(C) a condensation catalyst comprising a bismuth(III) sulfonate, with the proviso that the bismuth sulfonate does not comprise a perhaloalkyl group.

22. The composition of claim 21, comprising a bismuth (III) sulfonate complex of the formula (1):

$$Bi(O_3SR^9)_r(Q)_{3-r} \qquad (1)$$

where $R^9$ is chosen from a linear alkyl, a branched alkyl, a cycloalkyl, a heteroaryl, an aralkyl, a branched aralkyl, a heteroalkyl, a heterocycloalkyl, a heteroaralkyl, an aryl, or a combination of two or more thereof, Q is an anionic ligand, and r is 1 to 3.

23. The composition of claim 21 comprising from about 0.001 to about 7 parts per weight of catalyst component (C) per 100 parts per weight of the polymer (A).

24. The composition of claim 21 comprising from about 0.01 to about 7 parts per weight catalyst (C) per 100 parts per weight of the polymer (A).

25. The composition of claim 21 comprising from about 0.005 to about 0.05 wt. pt. of catalyst component (C) per 100 parts of component.

26. The composition of claim 21, wherein the polymer (A) is chosen from a silylated polyurethane (SPUR), a silylated polyester, a silylated polyether, a silylated polycarbonate, a silylated polyolefin, a silylated polyesterether, or a combination of two or more thereof.

27. The composition of claim 22, wherein $R^9$ is chosen from an alkyl, an aryl, an aralkyl, a cycloalkyl, or a combination of two or more thereof; and Q is chosen from an alkyl, an aryl, an aralkyl, a cycloalkyl, or a combination of two or more thereof.

28. The composition of claim 22, wherein $R^9$ is chosen from an alkyl, a cycloalkyl, an aryl, an aralkyl, or a combination thereof, and Q is a hydroxyl.

29. The composition of claim 22, wherein $R^9$ is chosen from an alkyl, a cycloalkyl, an aryl, an aralkyl, or a combination of two or more thereof.

30. The composition of claim 22, wherein at least one $(O_3SR^9)$ group comprises a $R^9$ chosen from a spirocyclic compound, a fused cyclic compound, a bridged cyclic compound, or combination of two or more thereof.

31. The composition of claim 22, wherein at least one $(O_3SR^9)$ group comprises a $R^9$ chosen from methyl or (7,7-dimethyl-2-oxobicyclo[2.2.1]heptan-1-yl)methyl.

32. A cured polymer formed from the composition or method of claim 21.

33. The cured polymer of claim 32 in the form of an elastomeric seal, duromeric seal, an adhesive, a coating, an encapsulant, a shaped article, a mold, or an impression material.

* * * * *